United States Patent
Cho et al.

(10) Patent No.: US 9,705,401 B2
(45) Date of Patent: Jul. 11, 2017

(54) BUCK-BOOST CONVERTERS AND POWER MANAGEMENT INTEGRATED CIRCUITS INCLUDING THE SAME

(71) Applicant: Samsung Electronics Co., Ltd., Suwon-si, Gyeonggi-do (KR)

(72) Inventors: Min-Soo Cho, Yongin-si (KR); Jae-Yeol Han, Seoul (KR); Dong-Jin Keum, Suwon-si (KR); Il-Young Sohn, Seongnam-si (KR); Ryotaro Kudo, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 56 days.

(21) Appl. No.: 14/742,002

(22) Filed: Jun. 17, 2015

(65) Prior Publication Data
US 2016/0099640 A1 Apr. 7, 2016

(30) Foreign Application Priority Data
Oct. 6, 2014 (KR) .......................... 10-2014-0134256

(51) Int. Cl.
*H02M 3/158* (2006.01)
*H02M 3/156* (2006.01)

(52) U.S. Cl.
CPC ....... *H02M 3/1582* (2013.01); *H02M 3/1563* (2013.01)

(58) Field of Classification Search
CPC .......................... H02M 3/1563; H02M 3/1582
See application file for complete search history.

(56) References Cited

U.S. PATENT DOCUMENTS

| 6,337,647 | B1 | 1/2002 | Masson et al. |
| 7,265,524 | B2* | 9/2007 | Jordan ................. H02M 3/158 323/225 |
| 7,495,419 | B1* | 2/2009 | Ju ........................... G05F 1/62 323/225 |
| 7,498,786 | B2 | 3/2009 | Prinz et al. |
| 7,714,562 | B2* | 5/2010 | Oswald ............... H02M 3/1563 323/284 |
| 7,737,668 | B2 | 6/2010 | Oswald et al. |

(Continued)

FOREIGN PATENT DOCUMENTS

| KR | 100729840 B1 | 6/2007 |
| KR | 20130032585 A | 4/2013 |

*Primary Examiner* — Fred E Finch, III
(74) *Attorney, Agent, or Firm* — Harness, Dickey & Pierce, PLC

(57) ABSTRACT

A buck-boost converter includes: a converting circuit; a ripple injector; a hysteresis comparator; and a switching controller. The converting circuit is configured to generate an output voltage by adjusting an input voltage in a buck mode, a boost mode, and a buck-boost mode. The ripple injector is configured to generate a ripple based on switching signals corresponding to switching operations of the converting circuit. The hysteresis comparator outputs at least one switching control signal by comparing an output control voltage with a feedback voltage generated by adding the ripple to a divided voltage generated by performing a voltage division on the output voltage. The switching controller is configured to change a current flow path of the converting circuit based on the at least one switching control signal.

15 Claims, 17 Drawing Sheets

(56) References Cited

U.S. PATENT DOCUMENTS

| | | |
|---|---|---|
| 7,777,457 B2 | 8/2010 | Haiplik |
| 7,944,420 B2 | 5/2011 | Antony |
| 8,018,212 B1 | 9/2011 | Petricek |
| 8,330,435 B2 | 12/2012 | Qiu et al. |
| 8,354,827 B2 | 1/2013 | Werle et al. |
| 8,618,788 B2 | 12/2013 | Trivedi et al. |
| 2009/0033293 A1 | 2/2009 | Xing et al. |
| 2011/0227550 A1* | 9/2011 | Walters ............... H02M 3/1582 323/283 |
| 2012/0133345 A1 | 5/2012 | Tai et al. |
| 2014/0266085 A1* | 9/2014 | Unno ....................... H02M 3/04 323/234 |
| 2015/0123631 A1* | 5/2015 | Hang ...................... H02M 1/32 323/271 |
| 2015/0263614 A1* | 9/2015 | Bansal ............... G01R 19/2506 323/282 |
| 2015/0303803 A1* | 10/2015 | Chen ..................... H02M 3/158 323/271 |

* cited by examiner

BUCK-BOOST CONVERTERS AND POWER MANAGEMENT INTEGRATED CIRCUITS INCLUDING THE SAME

CROSS-REFERENCE TO RELATED APPLICATION(S)

This application claims priority under 35 USC §119 to Korean Patent Application No. 10-2014-0134256, filed on Oct. 6, 2014 in the Korean Intellectual Property Office (KIPO), the entire contents of which are incorporated herein by reference.

BACKGROUND

Technical Field

Example embodiments relate generally to DC-DC converters. More particularly, example embodiments of inventive concepts relate to buck-boost converters capable of selectively operating in one of a buck mode, a buck-boost mode, and a boost mode, and power management integrated circuits including buck-boost converters.

Description of the Related Art

Recently, as mobile devices (e.g., smart phones, etc.) are more widely used in various fields of application, most mobile device manufacturers are trying to increase battery capacity of mobile devices to increase hours of use of the mobile devices. However, increasing the capacity of the battery included in the mobile device has a limit because increasing battery capacity of mobile devices may result in increased size of the mobile devices. Thus, to increase hours of usage, power consumption of internal devices (e.g., a processor, a memory device, etc.) of the mobile devices may be reduced by more efficiently managing power using a power management integrated circuit. Generally, a power management integrated circuit included in a mobile device includes at least one DC-DC converter that converts a voltage supplied by the battery into voltages that are suitable for the internal devices included in the mobile device. However, conventional DC-DC converters (e.g., a buck-boost converter, etc.) have relatively low conversion efficiency when a voltage level of an input voltage is relatively close to a voltage level of an output voltage.

SUMMARY

At least some example embodiments provide buck-boost converters capable of achieving relatively high (or improved) conversion efficiency by operating based on a hysteresis-based control.

At least some example embodiments provide power management integrated circuits including buck-boost converters.

According to at least one example embodiment, a buck-boost converter includes: a converting circuit; a ripple injector; a hysteresis comparator; and a switching controller. The converting circuit is configured to: generate a first output voltage by stepping down an input voltage in a buck mode; generate a third output voltage by stepping up the input voltage in a boost mode; and generate a second output voltage having a voltage level between a voltage level of the first output voltage and a voltage level of the third output voltage by stepping up or down the input voltage in a buck-boost mode. The ripple injector is configured to generate a ripple corresponding to an alternating-current voltage based on switching signals corresponding to switching operations of the converting circuit in the buck mode, the buck-boost mode, and the boost mode. The hysteresis comparator is configured to output at least one switching control signal by comparing an output control voltage with a feedback voltage that is generated by adding the ripple to a divided voltage, the divided voltage being generated by performing a voltage division on the first output voltage, the second output voltage, and the third output voltage in the buck mode, the buck-boost mode, and the boost mode, respectively. The switching controller is configured to change a current flow path of the converting circuit based on the at least one switching control signal.

In at least some example embodiments, the divided voltage may be maintained equal or substantially equal to the output control voltage. The first output voltage, the second output voltage, and the third output voltage may be determined according to the output control voltage in the buck mode, the buck-boost mode, and the boost mode, respectively.

In at least some example embodiments, the converting circuit may include: an input circuit; an output circuit; an inductor; a first switch; and a second switch. The input circuit may include: a third switch coupled to the input voltage; and a fourth switch coupled to a ground voltage. The input circuit may be configured to: provide the input voltage when the third switch is turned on and the fourth switch is turned off; and provide the ground voltage when the fourth switch is turned on and the third switch is turned off. The output circuit may include: a fifth switch coupled to an output node; a sixth switch coupled to the ground voltage; and a resistor string that generates the divided voltage. The output circuit may be configured to output the first output voltage, the second output voltage, and the third output voltage through the output node in the buck mode, the buck-boost mode, and the boost mode, respectively. The inductor may be between the input circuit and the output circuit. The first switch may be configured to perform a first switching operation that selectively couples a first terminal of the inductor to the third switch or the fourth switch. The second switch may be configured to perform a second switching operation that selectively couples a second terminal of the inductor to the fifth switch or the sixth switch.

In at least some example embodiments, the fifth switch may be maintained in an ON state, the sixth switch may be maintained in an OFF state, and the third switch and the fourth switch may be alternately turned on in the buck mode.

In at least some example embodiments, the third switch and the fourth switch may be alternately turned on, and the fifth switch and the sixth switch may be alternately turned on in the buck-boost mode.

In at least some example embodiments, the third switch may be maintained in an ON state, the fourth switch may be maintained in an OFF state, and the fifth switch and the sixth switch may be alternately turned on in the boost mode.

In at least some example embodiments, the ripple injector may generate the ripple based on a first switching signal corresponding to the first switching operation of the first switch in the buck mode.

In at least some example embodiments, the ripple injector may generate the ripple based on a second switching signal corresponding to the second switching operation of the second switch in the buck-boost mode and in the boost mode.

In at least some example embodiments, the hysteresis comparator may include: a first current path circuit; a second current path circuit; a comparison circuit; an adaptive hysteresis current circuit; and a hysteresis control switch circuit. The first current path circuit may be configured to allow a first current to flow based on the feedback voltage. The second current path circuit may be configured to allow a second current to flow based on the output control voltage. The comparison circuit may be configured to output the at least one switching control signal having a first logic level or a second logic level, which is opposite to the first logic level, by comparing a first comparison voltage generated at a first node of the first current path circuit as the first current flows through the first current path circuit with a second comparison voltage generated at a second node of the second current path circuit as the second current flows through the second current path circuit. The adaptive hysteresis current circuit may be coupled to the first current path circuit or the second current path circuit, and may be configured to adjust a hysteresis section by sinking a portion of the first current or a portion of the second current. The hysteresis control switch circuit may be configured to control a sinking operation of the adaptive hysteresis current circuit to form the hysteresis section.

In at least some example embodiments, the adaptive hysteresis current circuit may include: a third current path circuit configured to allow a third current to flow based on the output control voltage; a fourth current path circuit configured to allow a fourth current to flow based on the feedback voltage; and a switch circuit configured to select the third current as a sinking current when the third current is smaller than the fourth current and to select the fourth current as the sinking current when the fourth current is smaller than the third current.

In at least some example embodiments, the hysteresis comparator may be configured to generate the at least one switching control signal by comparing the feedback voltage with the output control voltage based on a first hysteresis section in the buck mode and the boost mode.

In at least some example embodiments, the hysteresis comparator may be configured to generate the at least one switching control signal by comparing the feedback voltage with the output control voltage based on a first hysteresis section and a second hysteresis section in the buck-boost mode.

According to at least one other example embodiment, a power management integrated circuit may include at least one buck-boost converter and a power management processor configured to control the at least one buck-boost converter. The at least one buck-boost converter includes: a converting circuit; a ripple injector; a hysteresis comparator; and a switching controller. The converting circuit is configured to: generate a first output voltage by stepping down an input voltage in a buck mode; generate a third output voltage by stepping up the input voltage in a boost mode; and generate a second output voltage having a voltage level between a voltage level of the first output voltage and a voltage level of the third output voltage by stepping up or down the input voltage in a buck-boost mode. The ripple injector is configured to generate a ripple corresponding to an alternating-current voltage based on switching signals corresponding to switching operations of the converting circuit in the buck mode, the buck-boost mode, and the boost mode. The hysteresis comparator is configured to output at least one switching control signal by comparing an output control voltage with a feedback voltage that is generated by adding the ripple to a divided voltage, the divided voltage being generated by performing voltage division on the first output voltage, the second output voltage, and the third output voltage in the buck mode, the buck-boost mode, and the boost mode, respectively. The switching controller is configured to change a current flow path of the converting circuit based on the at least one switching control signal.

In at least some example embodiments, the divided voltage may be maintained equal or substantially equal to the output control voltage. The first output voltage, the second output voltage, and the third output voltage may be determined according to the output control voltage in the buck mode, the buck-boost mode, and the boost mode, respectively.

In at least some example embodiments, the power management integrated circuit may be implemented as a system on-chip.

In at least some example embodiments, the converting circuit may include: an input circuit; an output circuit; an inductor; a first switch; and a second switch. The input circuit may include a third switch coupled to the input voltage and a fourth switch coupled to a ground voltage. The input circuit may be configured to provide the input voltage when the third switch is turned on and the fourth switch is turned off, and to provide the ground voltage when the fourth switch is turned on and the third switch is turned off. The output circuit may include: a fifth switch coupled to an output node; a sixth switch coupled to the ground voltage; and a resistor string configured to generate the divided voltage. The output circuit may be configured to output the first output voltage, the second output voltage, and the third output voltage through the output node in the buck mode, the buck-boost mode, and the boost mode, respectively. The inductor may be between the input circuit and the output circuit. The first switch may be configured to perform a first switching operation that selectively couples a first terminal of the inductor to the third switch or the fourth switch. The second switch may be configured to perform a second switching operation that selectively couples a second terminal of the inductor to the fifth switch or the sixth switch.

In at least some example embodiments, the ripple injector may generate the ripple based on a first switching signal corresponding to the first switching operation of the first switch in the buck mode.

In at least some example embodiments, the ripple injector may generate the ripple based on a second switching signal corresponding to the second switching operation of the second switch in the buck-boost mode and the boost mode.

In at least some example embodiments, the hysteresis comparator may include: a first current path circuit; a second current path circuit; a comparison circuit; an adaptive hysteresis current circuit; and a hysteresis control switch circuit. The first current path circuit may be configured to allow a first current to flow based on the feedback voltage. The second current path circuit may be configured to allow a second current to flow based on the output control voltage. The comparison circuit may be configured to output the at least one switching control signal having a first logic level or a second logic level that is opposite to the first logic level by comparing a first comparison voltage that is generated at a first node of the first current path circuit as the first current flows through the first current path with a second comparison voltage that is generated at a second node of the second current path circuit as the second current flows through the second current path circuit. The adaptive hysteresis current circuit may be coupled to the first current path circuit or the second current path circuit, and may be configured to adjust a hysteresis section by sinking a portion of the first current or a portion of the second current. The hysteresis control switch circuit may be configured to control a sinking operation of the adaptive hysteresis current circuit to form the hysteresis section.

In at least some example embodiments, the adaptive hysteresis current circuit may include: a third current path circuit configured to allow a third current to flow based on the output control voltage; a fourth current path circuit configured to allow a fourth current to flow based on the feedback voltage; and a switch circuit configured to select the third current as a sinking current when the third current is smaller than the fourth current and to select the fourth current as the sinking current when the fourth current is smaller than the third current.

According to still at least one other example embodiment, a hysteresis comparator includes: a first current path circuit configured to allow a first current to flow based on a first input voltage; a second current path circuit configured to allow a second current to flow based on a second input voltage; a comparison circuit configured to output a comparison result signal having a first logic level or a second logic level, which is opposite to the first logic level, by comparing a first comparison voltage generated at a first node of the first current path circuit as the first current flows through the first current path circuit with a second comparison voltage generated at a second node of the second current path circuit as the second current flows through the second current path circuit; an adaptive hysteresis current circuit coupled to the first current path circuit or the second current path circuit, the adaptive hysteresis current circuit being configured to adjust a hysteresis section by sinking a portion of the first current or a portion of the second current; and a hysteresis control switch circuit configured to control a sinking operation of the adaptive hysteresis current circuit to form the hysteresis section.

In at least some example embodiments, the first input voltage may be a variable voltage, and the second input voltage may be a fixed voltage. The adaptive hysteresis current circuit may sink the portion of the second current.

In at least some example embodiments, when the first input voltage increases, the second comparison voltage may increase as the second current increases. On the other hand, when the first input voltage decreases, the second comparison voltage may decrease as the second current decreases.

In at least some example embodiments, the hysteresis control switch circuit may control the portion of the second current to sink by turning on the hysteresis control switch circuit as the first input voltage increases. On the other hand, the hysteresis control switch circuit may control the portion of the second current not to sink by turning off the hysteresis control switch circuit as the first input voltage decreases.

In at least some example embodiments, the adaptive hysteresis current circuit may include: a third current path circuit configured to allow a third current to flow based on the second input voltage; a fourth current path circuit configured to allow a fourth current to flow based on the first input voltage; and a switch circuit configured to select the third current as a sinking current when the third current is smaller than the fourth current and to select the fourth current as the sinking current when the fourth current is smaller than the third current.

At least one other example embodiment provides a buck-boost converter including: a hysteresis comparator; a switching circuit; and a converting circuit. The hysteresis comparator is configured to: compare a first voltage with a second voltage, the first voltage being based at least partially on a ripple voltage; output a switching control signal having a first voltage level based on the comparison; and maintain the switching control signal at the first voltage level until the first voltage reaches a threshold level, independent of whether the first voltage exceeds or falls below the second voltage. The switching circuit is configured to output switching signals based on the switching control signal from the hysteresis comparator. The converting circuit is configured to adjust an input voltage to generate an output voltage based on the switching signals from the switching circuit.

In to at least some example embodiments, the converting circuit may be further configured to increase or decrease the input voltage to generate the output voltage based on an operating mode of the buck-boost converter, the operating mode being one of a buck mode, a buck-boost mode, and a boost mode.

The first voltage may be a feedback voltage; and the converting circuit may include a voltage divider circuit configured to generate a division voltage based on the output voltage. The converting circuit may be further configured to combine the ripple voltage and the division voltage to generate the feedback voltage.

The second voltage may be a feedback voltage, and the converting circuit may include a voltage divider circuit configured to generate the feedback voltage based on the output voltage. The converting circuit may be configured to combine the ripple voltage and an output control voltage to generate the first voltage.

According to at least some example embodiments, the buck-boost converter may further include a ripple injector configured to generate the ripple voltage corresponding to an alternating-current voltage based on switching signals from the converting circuit.

According to at least some example embodiments, a buck-boost converter may generate a ripple based on switching signals corresponding to switching operations of (or inside) a converting circuit, may output a switching control signal by comparing an output control voltage with a feedback voltage that is generated by adding the ripple to a divided voltage that is generated by performing a voltage division on an output voltage, and may change a current flow path of the converting circuit based on the switching control signal in a buck mode, a buck-boost mode, and a boost mode when the buck-boost converter converts an input voltage (e.g., a direct-current (DC) voltage) into an output voltage (e.g., a DC voltage). Thus, using one input voltage, the buck-boost converter may output an output voltage that is stepped down from the input voltage (e.g., in the buck mode), may output an output voltage having a voltage level that is relatively close to a voltage level of the input voltage (e.g., in the buck-boost mode), and may output an output voltage that is stepped up from the input voltage (e.g., in the boost mode). In other words, according to at least some example embodiments, the buck-boost converter may output the output voltage having a wider output range as compared to conventional buck-boost converters. Here, the buck-boost converter may achieve relatively high (or improved) conversion efficiency because the buck-boost converter operates based on a hysteresis-based control.

According to at least some example embodiments, a power management integrated circuit may more efficiently manage power supplied by a battery (or other power supply) by including the buck-boost converter. Thus, power consumption of internal devices (e.g., a processor, a memory device, etc.) included in an electronic device (e.g., a mobile device, etc.) having the power management integrated circuit may be reduced.

BRIEF DESCRIPTION OF THE DRAWINGS

Illustrative, non-limiting example embodiments will be more clearly understood from the following detailed description in conjunction with the accompanying drawings.

DETAILED DESCRIPTION

Figure 1:
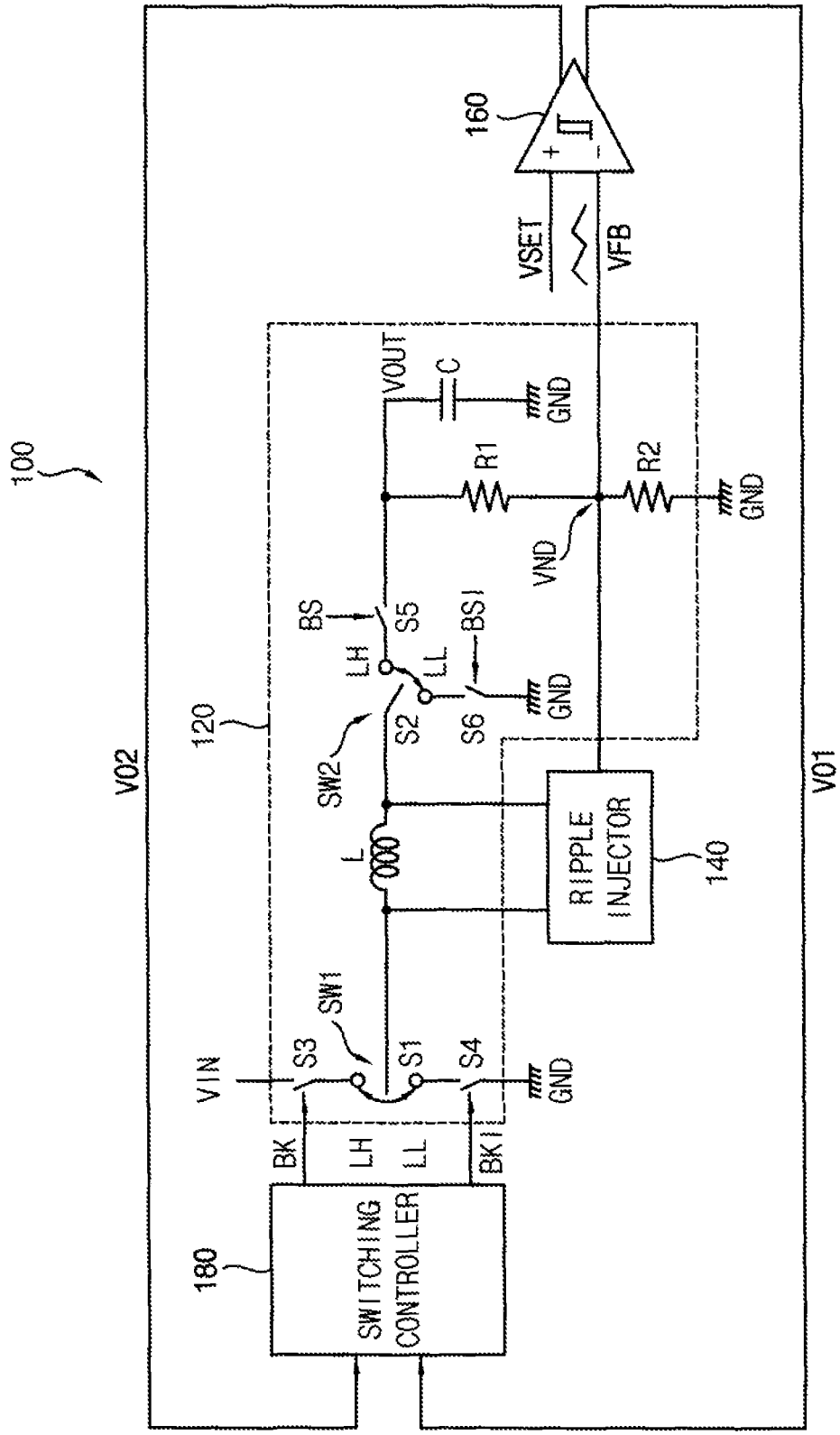
FIG. 1 is a block diagram illustrating a buck-boost converter according to example embodiments.

Various example embodiments will be described more fully with reference to the accompanying drawings, in which some example embodiments are shown. Inventive concepts may, however, be embodied in many different forms and should not be construed as limited to the embodiments set forth herein. Rather, these embodiments are provided so that this disclosure will be thorough and complete, and will fully convey the scope of inventive concepts to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of inventive concepts. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of inventive concepts. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, example embodiments will be described, some cases, with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing converters, power management integrated circuits, electronic devices, etc. Such existing hardware may include one or more Central Processing Units (CPUs), graphics processing units (GPUs), image processors, system-on-chip (SOC) devices, digital signal processors (DSPs), application-specific-integrated-circuits, field programmable gate arrays (FPGAs), or the like.

Furthermore, at least some components of one or more example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors may be programmed to perform the necessary tasks, thereby being transformed into special purpose processor(s) or computer(s).

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible or non-transitory machine readable mediums for storing information. The term "computer-readable medium" may include, but is not limited to, portable or fixed storage devices, optical storage devices, and various other tangible or non-transitory mediums capable of storing, containing or carrying instruction(s) and/or data.

Figure 2:
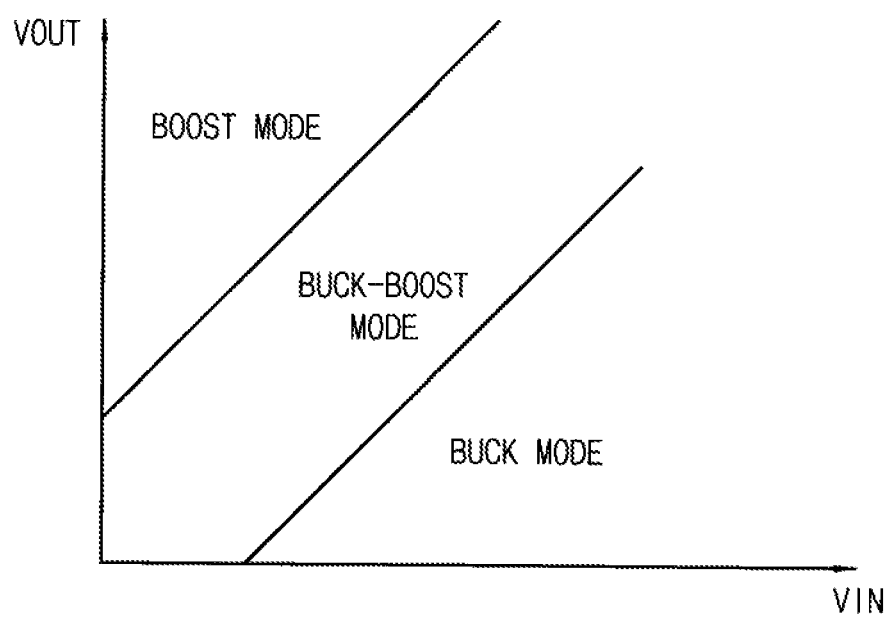
FIG. 2 is a diagram illustrating an example operating mode of the buck-boost converter of FIG. 1.

FIG. 1 is a block diagram illustrating a buck-boost converter according to example embodiments. FIG. 2 is a diagram illustrating operating modes of the buck-boost converter of FIG. 1.

Referring to FIGS. 1 and 2, the buck-boost converter 100 may include a converting circuit 120, a ripple injector (also referred to herein as a ripple injector circuit) 140, a hysteresis comparator (also referred to herein as a hysteresis comparison circuit) 160, and a switching controller 180 (also referred to herein as a switching control circuit).

The converting circuit 120 may generate a first output voltage VOUT by stepping down an input voltage VIN in a buck mode, may generate a third output voltage VOUT by stepping up the input voltage VIN in a boost mode, and may generate a second output voltage VOUT by stepping up or down the input voltage VIN in a buck-boost mode, where the second output voltage has a voltage level between a voltage level of the first output voltage VOUT and a voltage level of the third output voltage VOUT. Since the first output voltage VOUT is generated by stepping down the input voltage VIN, the voltage level of the first output voltage VOUT may be lower than a voltage level of the input voltage VIN. Since the third output voltage VOUT is generated by stepping up the input voltage VIN, the voltage level of the third output voltage VOUT may be higher than the voltage level of the input voltage VIN. Since the voltage level of the second output voltage VOUT is relatively close to the voltage level of the input voltage VIN, the voltage level of the second output voltage VOUT may be higher than the voltage level of the first output voltage VOUT and lower than the voltage level of the third output voltage VOUT. That is, for example, as illustrated in FIG. 2, when the buck-boost converter 100 operates in the buck mode, the input voltage VIN may have a voltage level that is higher than the voltage level of the output voltage VOUT (i.e., the first output voltage VOUT). In addition, when the buck-boost converter 100 operates in the buck-boost mode, the input voltage VIN may have a voltage level that is relatively close to the voltage level of the output voltage VOUT (i.e., the second output voltage VOUT). Furthermore, when the buck-boost converter 100 operates in the boost mode, the input voltage VIN may have a voltage level that is lower than the voltage level of the output voltage VOUT (i.e., the third output voltage VOUT). Although a boundary of the operating mode of the buck-boost converter 100 (e.g., a boundary between the boost mode and the buck-boost mode and a boundary between the buck-boost mode and the buck mode) is marked by a solid line in FIG. 2, a hysteresis-based control may be performed when the operating mode of the buck-boost converter 100 is changed.

In at least one example embodiment, the converting circuit 120 may include an input part (or circuit) S3 and S4, an output part (or circuit) S5, S6, R1, R2, and C, an inductor L, a first switch S1, and a second switch S2. Specifically, the input part S3 and S4 may include a third switch S3 and a fourth switch S4. The third switch S3 may be coupled to the input voltage VIN. The fourth switch S4 may be coupled to a ground voltage GND. Thus, when the third switch S3 is turned on and the fourth switch S4 is turned off, the input part S3 and S4 may provide the input voltage VIN. In addition, when the third switch S3 is turned off and the fourth switch S4 is turned on, the input part S3 and S4 may provide the ground voltage GND. Here, the third switch S3 and the fourth switch S4 may operate in reverse. That is, for example, when the third switch S3 is turned on, the fourth switch S4 may be turned off. In addition, when the fourth switch S4 is turned on, the third switch S3 may be turned off. In at least one example embodiment, the third switch S3 and the fourth switch S4 may be implemented by the same type of transistors. For example, the third switch S3 and the fourth switch S4 may be implemented by N-channel metal oxide semiconductor (NMOS) transistors or by P-channel metal oxide semiconductor (PMOS) transistors. In this case, a third switching signal BK may be applied to the third switch S3, and a fourth switching signal BKI, which is generated by inverting the third switching signal BK, may be applied to the fourth switch S4. In at least one other example embodiment, the third switch S3 and the fourth switch S4 may be implemented by different types of transistors. For example, the third switch S3 may be implemented by a PMOS transistor, and the fourth switch S4 may be implemented by an NMOS transistor. In this case, a third switching signal BK may be applied to the third switch S3, and a fourth switching signal BKI, which is the same as the third switching signal BK, may be applied to the fourth switch S4. However, a structure of the input part S3 and S4 is not limited to these example embodiments.

The output part S5, S6, R1, R2, and C may include a fifth switch S5, a sixth switch S6, a first resistor R1, a second resistor R2, and a capacitor C. Here, an output node through which the output voltage VOUT is output may be a coupling node at which a first terminal of the capacitor C is coupled to a first terminal of the first resistor R1. In addition, a division node through which a divided voltage VND is output may be a coupling node at which a second terminal of the first resistor R1 is coupled to a first terminal of the second resistor R2. That is, for example, the first resistor R1 and the second resistor R2 may constitute a resistor string for generating the divided voltage VND. The divided voltage VND may be generated in a way that voltage division is performed on the output voltage VOUT by the first resistor R1 and the second resistor R2. In addition, a second terminal of the second resistor R2 may be coupled to the ground voltage GND, and a second terminal of the capacitor C may also be coupled to the ground voltage GND.

The inductor L may be located between the input part S3 and S4 and the output part S5, S6, R1, R2, and C. Thus, when the fifth switch S5 is turned on and the sixth switch S6 is turned off, the inductor L may be coupled to the output node. In addition, when the sixth switch S6 is turned on and the fifth switch S5 is turned off, the inductor L may be coupled to the ground voltage GND. Here, the fifth switch S5 and the sixth switch S6 may operate in reverse. That is, for example, when the fifth switch S5 is turned on, the sixth switch S6 may be turned off. In addition, when the sixth switch S6 is turned on, the fifth switch S5 may be turned off. In at least this example embodiment, the fifth switch S5 and the sixth switch S6 may be implemented by the same type of transistors. In this case, a fifth switching signal BS may be applied to the fifth switch S5, and a sixth switching signal BSI, which is generated by inverting the fifth switching signal BS, may be applied to the sixth switch S6. In another example embodiment, the fifth switch S5 and the sixth switch S6 may be implemented by different types of transistors. In this case, a fifth switching signal BS may be applied to the fifth switch S5, and a sixth switching signal BSI, which is the same as the fifth switching signal BS, may be applied to the sixth switch S6. However, a structure of the output part S5, S6, R1, R2, and C is not limited to these example embodiments.

The first switch S1 may perform a first switching operation that selectively couples a first terminal of the inductor L to the third switch S3 or the fourth switch S4 of the input part S3 and S4. More specifically, when the third switch S3 of the input part S3 and S4 is turned on, the first switch S1 may couple the first terminal of the inductor L to the third switch S3 of the input part S3 and S4 (indicated as LH). In addition, when the fourth switch S4 of the input part S3 and S4 is turned on, the first switch S1 may couple the first terminal of the inductor L to the fourth switch S4 of the input part S3 and S4 (indicated as LL).

The second switch S2 may perform a second switching operation that selectively couples a second terminal of the inductor L to the fifth switch S5 or the sixth switch S6 of the output part S5, S6, R1, R2, and C. Specifically, when the fifth switch S5 of the output part S5, S6, R1, R2, and C is turned on, the second switch S2 may couple the second terminal of the inductor L to the fifth switch S5 of the output part S5, S6, R1, R2, and C (indicated as LH). In addition, when the sixth switch S6 of the output part S5, S6, R1, R2, and C is turned on, the second switch S2 may couple the second terminal of the inductor L to the sixth switch S6 of the output part S5, S6, R1, R2, and C (indicated as LL).

As described above, the output part S5, S6, R1, R2, and C may output the first output voltage VOUT through the output node in the buck mode, may output the second output voltage VOUT through the output node in the buck-boost mode, and may output the third output voltage VOUT through the output node in the boost mode. For this operation, in the buck mode, the fifth switch S5 may be maintained in an ON state, the sixth switch S6 may be maintained in an OFF state, and the third switch S3 and the fourth switch S4 may be alternately turned on.

In the buck-boost mode, the third switch S3 and the fourth switch S4 may be alternately turned on, and the fifth switch S5 and the sixth switch S6 may be alternately turned on.

In the boost mode, the third switch S3 may be maintained in an ON state, the fourth switch S4 may be maintained in an OFF state, and the fifth switch S5 and the sixth switch S6 may be alternately turned on. These operations will be described in more detail later with reference to FIGS. 3A through 11.

Still referring to FIG. 1, the ripple injector 140 may generate a ripple (also referred to as a ripple voltage or ripple voltage signal) corresponding to an alternating-current (AC) voltage based on switching signals SW1 and SW2 corresponding to switching operations of (or inside) the converting circuit 120 in the buck mode, in the buck-boost mode, and/or in the boost mode. More specifically, the ripple injector 140 may generate the ripple based on a first switching signal SW1 corresponding to a first switching operation of the first switch S1 included in the converting circuit 120 in the buck mode. In one example, the ripple that the ripple injector 140 generates in the buck mode may have a rising shape or a falling shape when the first switching signal SW1 has a first voltage level, and may have a falling shape or a rising shape when the first switching signal SW1 has a second voltage level, which is opposite to the first voltage level.

In the buck-boost mode, the ripple injector 140 may generate the ripple based on a second switching signal SW2 corresponding to a second switching operation of the second switch S2 included in the converting circuit 120. For example, the ripple that the ripple injector 140 generates in the buck-boost mode may have a falling shape or a rising shape when the second switching signal SW2 has a first voltage level, and may have a rising shape or a falling shape when the second switching signal SW2 has a second voltage level, which is opposite to the first voltage level.

In the boost mode, the ripple injector 140 may generate the ripple based on the second switching signal SW2 corresponding to the second switching operation of the second switch S2 included in the converting circuit 120. For example, the ripple that the ripple injector 140 generates in the boost mode may have a falling shape or a rising shape when the second switching signal SW2 has a first voltage level, and may have a rising shape or a falling shape when the second switching signal SW2 has a second voltage level, which is opposite to the first voltage level.

The hysteresis comparator 160 may output at least one switching control signal VO1 and VO2 by comparing an output control voltage VSET with the feedback voltage VFB that is generated by adding the ripple from the ripple injector 140 to the divided voltage VND. As described above, the divided voltage VND may be generated by performing voltage division on the output voltage VOUT.

More specifically, in the buck mode the hysteresis comparator 160 may output the switching control signal VO1 and VO2 by comparing the output control voltage VSET with the feedback voltage VFB that is generated by adding the ripple to the divided voltage VND that is generated by performing a voltage division on the first output voltage VOUT.

In the buck-boost mode, the hysteresis comparator 160 may output the switching control signal VO1 and VO2 by comparing the output control voltage VSET with the feedback voltage VFB that is generated by adding the ripple to the divided voltage VND that is generated by performing a voltage division on the second output voltage VOUT.

In the boost mode, the hysteresis comparator 160 may output the switching control signal VO1 and VO2 by comparing the output control voltage VSET with the feedback voltage VFB that is generated by adding the ripple to the divided voltage VND that is generated by performing a voltage division on the third output voltage VOUT. Here, the divided voltage VND may be maintained to be equal or substantially equal to the output control voltage VSET. Therefore, the first output voltage VOUT may be determined according to the output control voltage VSET in the buck mode, the second output voltage VOUT may be determined according to the output control voltage VSET in the buck-boost mode, and the third output voltage VOUT may be determined according to the output control voltage VSET in the boost mode. For example, assuming that a resistance of the first resistor R1 is about three times as large as a resistance of the second resistor R2, the output voltage VOUT may be about four times as large as the divided voltage VND. Thus, since the divided voltage VND is maintained to be equal or substantially equal to the output control voltage VSET, the output voltage VOUT may be about 4V when the output control voltage VSET is set to be about 1V, and the output voltage VOUT may be about 8V when the output control voltage VSET is set to be about 2V. In brief, the buck-boost converter 100 may adjust (or control) the output voltage VOUT by adjusting the output control voltage VSET.

In at least one example embodiment, the hysteresis comparator 160 may include a first current path, a second current path, a comparison block (or comparison circuit), and an adaptive hysteresis current block (or adaptive hysteresis current circuit). The first current path may allow a first current to flow based on the feedback voltage VFB. The second current path may allow a second current to flow based on the output control voltage VSET. The comparison block may output the switching control signal VO1 and VO2 having a first logic level or a second logic level, which is opposite to the first logic level, by comparing a first comparison voltage, which is generated at a first node of the first current path (or current path circuit) as the first current flows through the first current path, with a second comparison voltage, which is generated at a second node of the second current path (or current path circuit) as the second current flows through the second current path. The adaptive hysteresis current block may be coupled to the first current path or the second current path to change (or adjust) a hysteresis section by sinking a portion of the first current or a portion of the second current. Here, the adaptive hysteresis current block may include a third current path, a fourth current path, and a switch block (or switch circuit). The third current path (or current path circuit) may allow a third current to flow based on the output control voltage VSET. The fourth current path (or current path circuit) may allow a fourth current to flow based on the feedback voltage VFB. The switch block may select (or determine) the third current as a sinking current when the third current is smaller than the fourth current, and may select the fourth current as the sinking current when the fourth current is smaller than the third current. In at least some example embodiments, the hysteresis comparator 160 may generate the switching control signal VO1 and VO2 by comparing the feedback voltage VFB with the output control voltage VSET based on one hysteresis section in the buck mode and in the boost mode, and may generate the switching control signal VO1 and VO2 by comparing the feedback voltage VFB with the output control voltage VSET based on two hysteresis sections in the buck-boost mode. These operations will be described in more detail later with reference to FIGS. 12 through 14.

Still referring to FIG. 1, the switching controller 180 may change a current flow path of the converting circuit 120 based on the switching control signal VO1 and VO2 from the hysteresis comparator 160. As described above, the switching controller 180 may change the current flow path of the converting circuit 120 in the buck mode by maintaining the fifth switch S5 in the ON state, by maintaining the sixth switch S6 in the OFF state, and by alternately turning on the third switch S3 and the fourth switch S4. For example, a current of the converting circuit 120 may flow through the third switch S3, the inductor L, and the fifth switch S5 when the switching controller 180 turns on the third switch S3, and the current of the converting circuit 120 may flow through the fourth switch S4, the inductor L, and the fifth switch S5 when the switching controller 180 turns on the fourth switch S4.

In the buck-boost mode, the switching controller 180 may change the current flow path of the converting circuit 120 by alternately turning on the third switch S3 and the fourth switch S4 and by alternately turning on the fifth switch S5 and the sixth switch S6. For example, the current of the converting circuit 120 may flow through the third switch S3, the inductor L, and the sixth switch S6 when the switching controller 180 turns on the third switch S3 and the sixth switch S6, the current of the converting circuit 120 may flow through the third switch S3, the inductor L, and the fifth switch S5 when the switching controller 180 turns on the third switch S3 and the fifth switch S5, and the current of the converting circuit 120 may flow through the fourth switch S4, the inductor L, and the fifth switch S5 when the switching controller 180 turns on the fourth switch S4 and the fifth switch S5.

In the boost mode, the switching controller 180 may change the current flow path of the converting circuit 120 by maintaining the third switch S3 in an ON state, by maintaining the fourth switch S4 in the OFF state, and by alternately turning on the fifth switch S5 and the sixth switch S6. For example, the current of the converting circuit 120 may flow through the third switch S3, the inductor L, and the fifth switch S5 when the switching controller 180 turns on the fifth switch S5, and the current of the converting circuit 120 may flow through the third switch S3, the inductor L, and the sixth switch S6 when the switching controller 180 turns on the sixth switch S6.

As described above, the buck-boost converter 100 may generate the ripple based on the switching signals SW1 and SW2 corresponding to the switching operations of the converting circuit 120, may output the switching control signal VO1 and VO2 by comparing the output control voltage VSET with the feedback voltage VFB that is generated by adding the ripple to the divided voltage VND that is generated by performing a voltage division on the output voltage VOUT, and may change the current flow path of the converting circuit 120 based on the switching control signal VO1 and VO2 in the buck mode, in the buck-boost mode, and in the boost mode when the buck-boost converter 100 converts the input voltage VIN into the output voltage VOUT. Thus, the buck-boost converter 100 may output the first output voltage VOUT that is stepped down from the input voltage VIN in the buck mode, may output the second output voltage VOUT having the voltage level that is relatively close to the voltage level of the input voltage VIN in the buck-boost mode, and may output the third output voltage VOUT that is stepped up from the input voltage VIN in the boost mode. That is, for example, using one input voltage VIN, the buck-boost converter 100 may output the output voltage VOUT having a wider output range as compared to conventional buck-boost converters. The buck-boost converter 100 may achieve relatively high (or, improved) conversion efficiency because the buck-boost converter 100 operates based on the hysteresis-based control. In addition, a power management integrated circuit including the buck-boost converter 100 may reduce power consumption of internal devices (e.g., a processor, a memory device, etc.) included in an electronic device (e.g., a mobile device, etc.) by more efficiently managing power supplied by a battery (or other power supply) of the electronic device. Meanwhile, although components of the buck-boost converter 100 for describing an operation of the buck-boost converter 100 are illustrated in FIG. 1, components of the buck-boost converter 100 are not limited thereto. For example, the buck-boost converter 100 may further include a resistor, a capacitor, an inductor, an inverter, a buffer, etc.

Figure 3A:
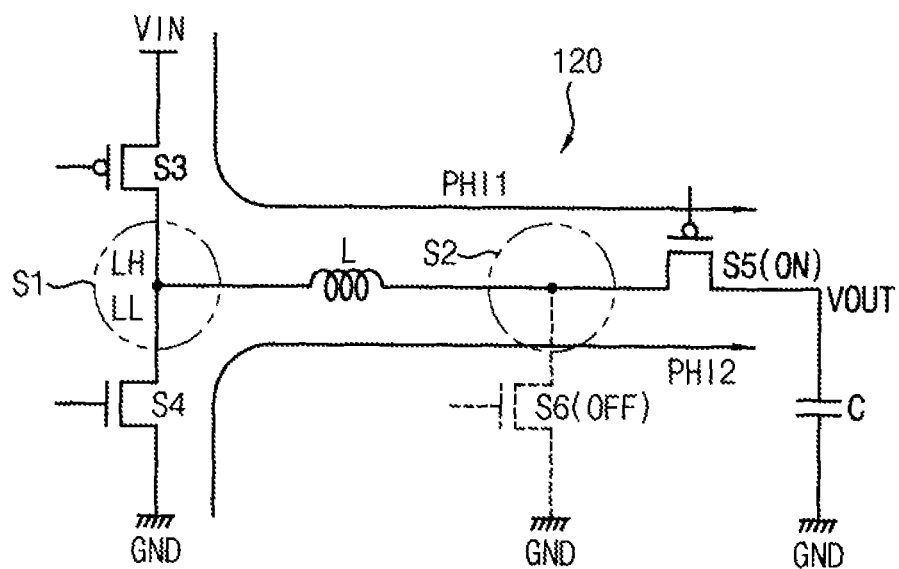
FIGS. 3A and 3B are diagrams for describing a buck mode of the buck-boost converter of FIG. 1.
Figure 3B:
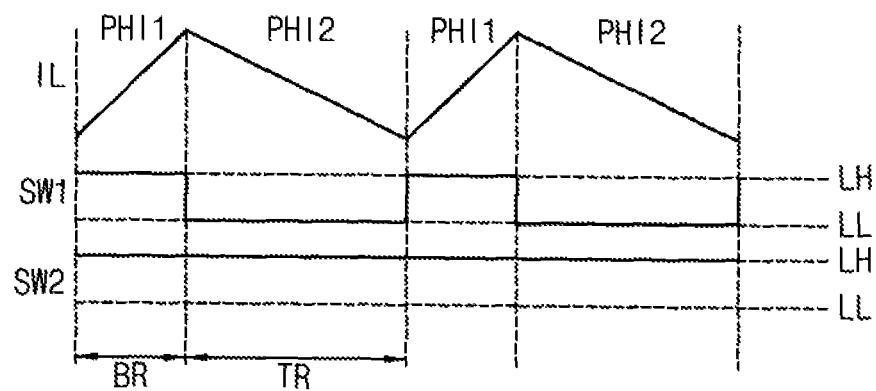

FIGS. 3A and 3B are diagrams for describing a buck mode of the buck-boost converter of FIG. 1.

Referring to FIGS. 3A and 3B, the buck-boost converter 100 may operate in the buck mode. As illustrated in FIG. 3A, in the buck mode, since the fifth switch S5 is maintained in the ON state and the sixth switch S6 is maintained in the OFF state, the current flow path of the converting circuit 120 may be changed as the third switch S3 and the fourth switch S4 are alternately turned on. As described above, since the buck-boost converter 100 generates the first output voltage VOUT by stepping down the input voltage VIN in the buck mode. In this case, the voltage level of the first output voltage VOUT may be lower than the voltage level of the input voltage VIN.

More specifically, when the buck-boost converter 100 operates in the buck mode, the converting circuit 120 may repetitively perform a current build-up operation and a current transfer operation. For example, when the converting circuit 120 performs the current build-up operation, the converting circuit 120 may form a first current flow path PHI1. That is, for example, the current of the converting circuit 120 may flow through the third switch S3, the inductor L, and the fifth switch S5. On the other hand, when the converting circuit 120 performs the current transfer operation, the converting circuit 120 may form a second current flow path PHI2. That is, for example, the current of the converting circuit 120 may flow through the fourth switch S4, the inductor L, and the fifth switch S5. Therefore, as illustrated in FIG. 3B, when an operating period BR+TR in which the converting circuit 120 operates is fixed, the first output voltage VOUT may increase during a first period BR in which the converting circuit 120 performs the current build-up operation. For example, the first output voltage VOUT may get higher as the first period BR in which the converting circuit 120 performs the current build-up operation gets wider. On the other hand, the first output voltage VOUT may decrease during a second period TR in which the converting circuit 120 performs the current transfer operation. For example, the first output voltage VOUT may get lower as the second period TR in which the converting circuit 120 performs the current transfer operation gets wider. The first switch S1 may couple the first terminal of the inductor L to the third switch S3 (indicated as LH) when the third switch S3 is turned on. The first switch S1 may couple the first terminal of the inductor L to the fourth switch S4 (indicated as LL) when the fourth switch S4 is turned on. When the converting circuit 120 forms the first current flow path PHI1, the first switching signal SW1 corresponding to the first switching operation of the first switch S1 may have a first voltage level LH (e.g., a logic 'high' level). When the converting circuit 120 forms the second current flow path PHI2, the first switching signal SW1 corresponding to the first switching operation of the first switch S1 may have a second voltage level LL (e.g., a logic 'low' level). Meanwhile, in the buck mode, since the fifth switch S5 is maintained in the ON state and the sixth switch S6 is maintained in the OFF state, the second switching signal SW2 corresponding to the second switching operation of the second switch S2 may be maintained to have a first voltage level LH (e.g., a logic 'high' level). Here, the reference character "IL" refers to the current of the inductor L.

Figure 4:
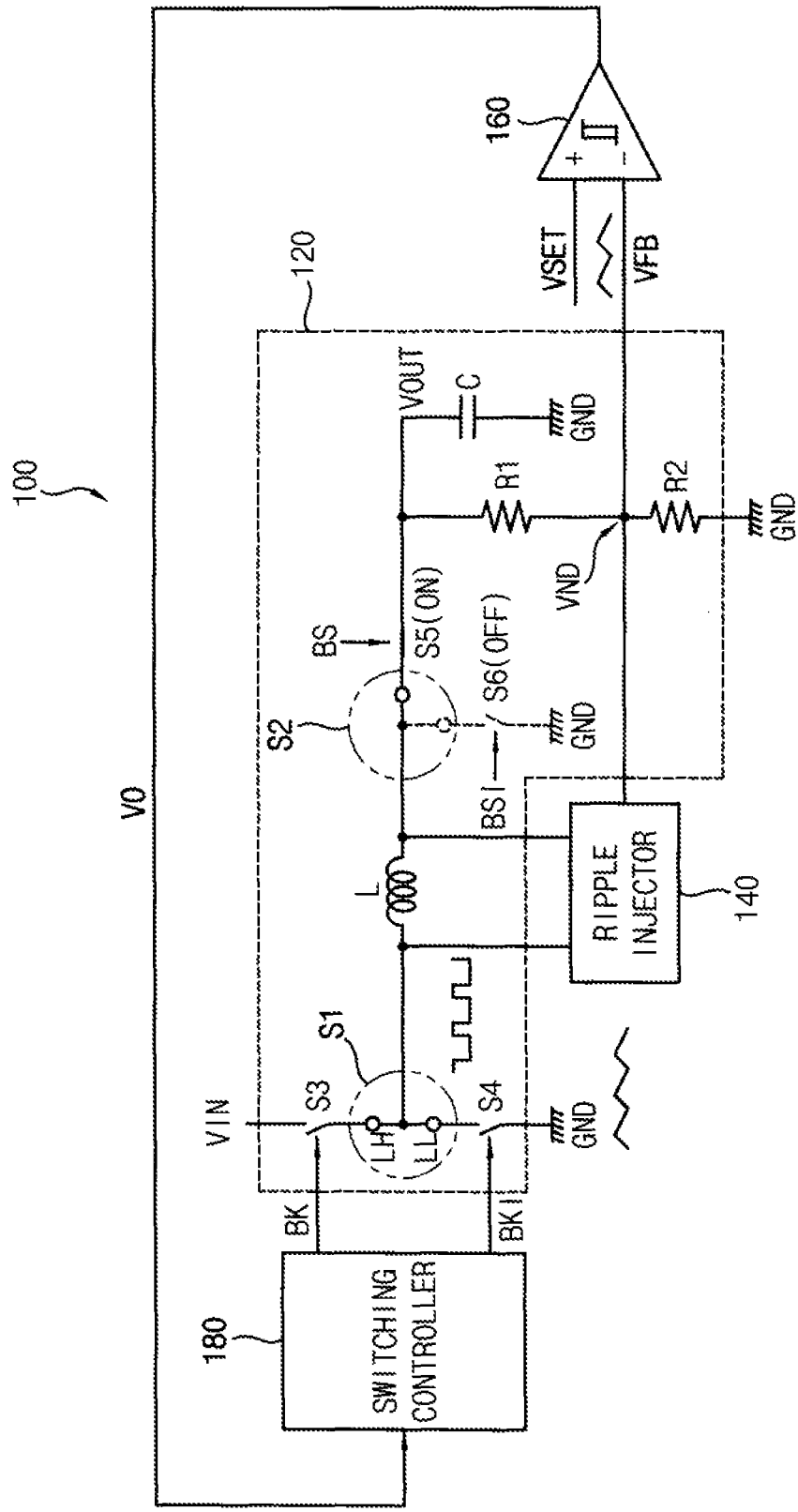
FIG. 4 is a block diagram illustrating an example in which the buck-boost converter of FIG. 1 operates in the buck mode.
Figure 5:
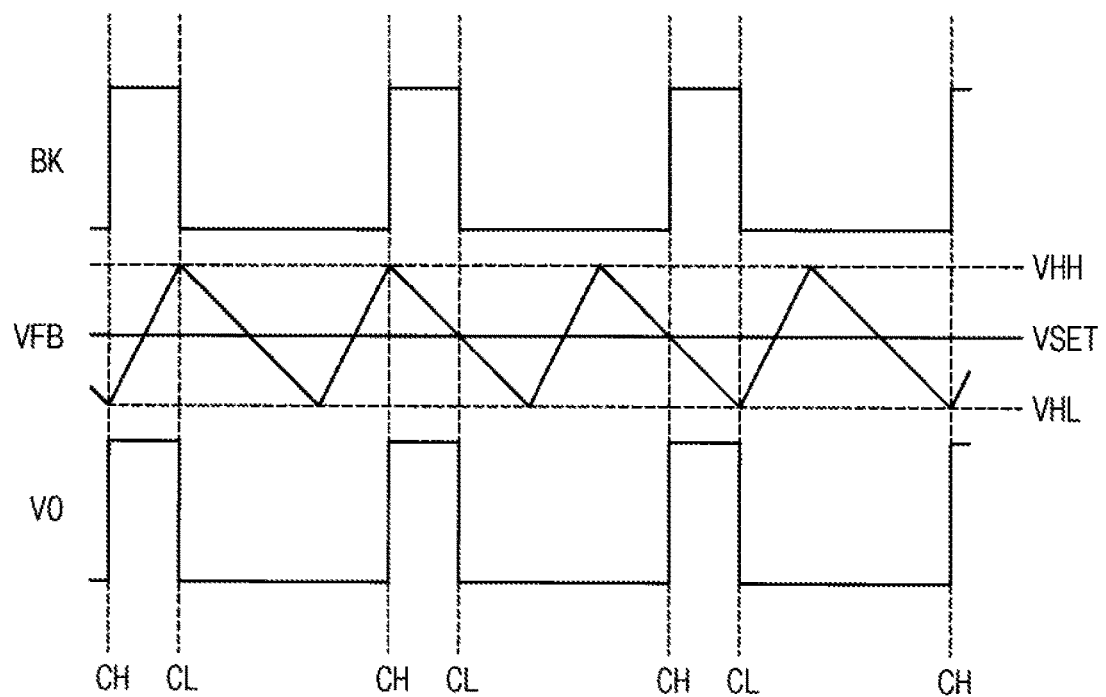
FIG. 5 is a timing diagram illustrating an example in which the buck-boost converter of FIG. 1 operates in the buck mode.

FIG. 4 is a block diagram illustrating another example in which the buck-boost converter of FIG. 1 operates in the buck mode. FIG. 5 is a timing diagram illustrating an example in which the buck-boost converter of FIG. 1 operates in the buck mode.

Referring to FIGS. 4 and 5, the buck-boost converter 100 may generate the switching control signal VO by comparing the output control voltage VSET with the feedback voltage VFB that is generated by adding the ripple from the ripple injector 140 to the divided voltage VND, which is generated by performing a voltage division on the first output voltage VOUT. The buck-boost converter 100 may change the current flow path of the converting circuit 120 based on the switching control signal VO.

As illustrated in FIG. 4, in the buck mode, since the fifth switch S5 is maintained in the ON state and the sixth switch S6 is maintained in the OFF state, the current flow path of the converting circuit 120 may be changed as the third switch S3 and the fourth switch S4 are alternately turned on. To this end, the third switching signal BK may be applied to the third switch S3, and the fourth switching signal BKI may be applied to the fourth switch S4. In at least one example embodiment, the third switch S3 and the fourth switch S4 may be implemented by the same type of transistors. In this case, the fourth switching signal BKI may be generated by inverting the third switching signal BK. In another example embodiment, the third switch S3 and the fourth switch S4 may be implemented by different types of transistors. In this case, the fourth switching signal BKI may be the same as the third switching signal BK. In the converting circuit 120, the first switch S1 may couple the first terminal of the inductor L to the third switch S3 (indicated as LH) when the third switch S3 is turned on, and may couple the first terminal of the inductor L to the fourth switch S4 (indicated as LL) when the fourth switch S4 is turned on. Thus, the ripple injector 140 may generate the ripple based on the first switching signal SW1 corresponding to the above switching operation. In addition, the ripple may be added to the divided voltage VND, where the divided voltage VND is a DC voltage, at the resistor string including the first resistor R1 and the second resistor R2. Thus, the feedback voltage VFB corresponding to the ripple plus the divided voltage VND may be generated at the resistor string. Here, the feedback voltage VFB may be applied to a second input terminal (e.g., a negative input terminal) of the hysteresis comparator 160. In addition, the output control voltage VSET may be applied to a first input terminal (e.g., a positive input terminal) of the hysteresis comparator 160. The hysteresis comparator 160 may generate the switching control signal VO by comparing the feedback voltage VFB with the output control voltage VSET.

As illustrated in FIG. 5, the hysteresis comparator 160 may have a hysteresis section VHH–VHL. More specifically, when the feedback voltage VFB is compared with the output control voltage VSET, the hysteresis comparator 160 may maintain a logic level of the switching control signal VO (e.g., the first logic level) until the feedback voltage VFB reaches an upper hysteresis voltage VHH even though the feedback voltage VFB becomes larger than the output control voltage VSET. Subsequently, when the feedback voltage VFB reaches the upper hysteresis voltage VHH, the hysteresis comparator 160 may change the logic level of the switching control signal VO from the first logic level to the second logic level (indicated as CL). Similarly, when the feedback voltage VFB is compared with the output control voltage VSET, the hysteresis comparator 160 may maintain the logic level of the switching control signal VO (e.g., the second logic level) until the feedback voltage VFB reaches a lower hysteresis voltage VHL even though the feedback voltage VFB becomes smaller than the output control voltage VSET. Subsequently, when the feedback voltage VFB reaches the lower hysteresis voltage VHL, the hysteresis comparator 160 may change the logic level of the switching control signal VO from the second logic level to the first logic level (indicated as CH). Thus, the switching controller 180 may change the current flow path of the converting circuit 120 based on the switching control signal VO. For example, the switching controller 180 may turn on the third switch S3 and may turn off the fourth switch S4 when the switching control signal VO has the first logic level. In addition, the switching controller 180 may turn off the third switch S3 and may turn on the fourth switch S4 when the switching control signal VO has the second logic level. In the buck mode, the converting circuit 120 may repetitively perform the current build-up operation and the current transfer operation, and thus may generate the first output voltage VOUT by stepping down the input voltage VIN.

Figure 6A:
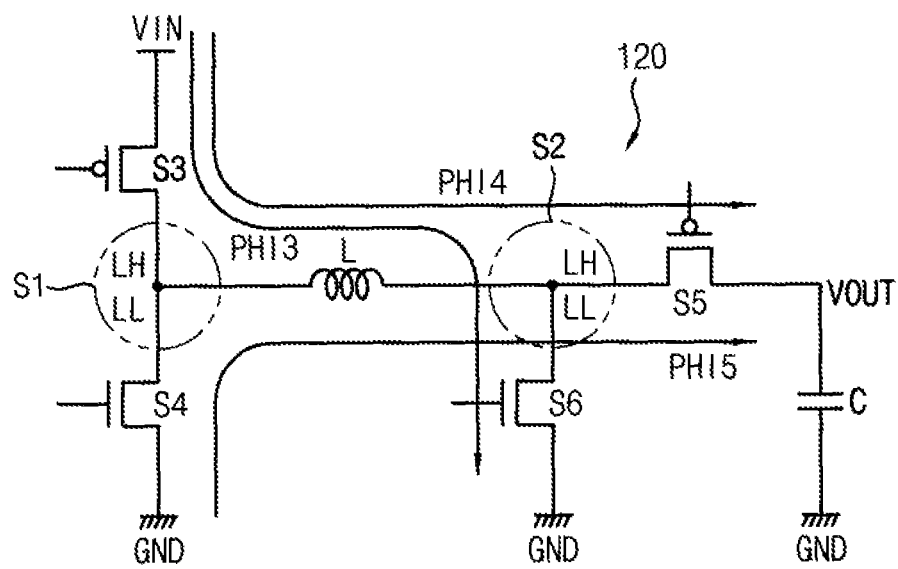
FIGS. 6A and 6B are diagrams for describing a buck-boost mode of the buck-boost converter of FIG. 1.
Figure 6B:
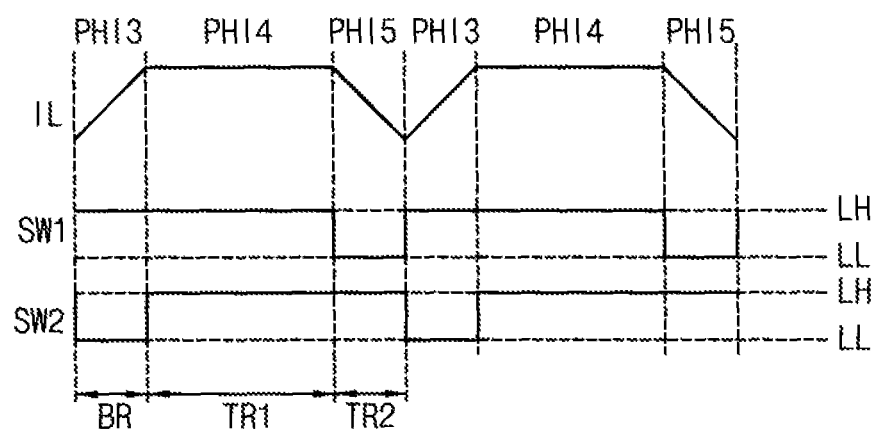

FIGS. 6A and 6B are diagrams for describing a buck-boost mode of the buck-boost converter of FIG. 1.

Referring to FIGS. 6A and 6B, the buck-boost converter 100 may operate in the buck-boost mode. As illustrated in FIG. 6A, in the buck-boost mode, the current flow path of the converting circuit 120 may be changed as the third switch S3 and the fourth switch S4 are alternately turned on and the fifth switch S5 and the sixth switch S6 are alternately turned on. As described above, the buck-boost converter 100 may generate the second output voltage VOUT having a voltage level that is relatively close to the voltage level of the input voltage VIN by stepping up or down the input voltage VIN in the buck-boost mode. Thus, the second output voltage VOUT of the buck-boost mode has the voltage level between the voltage level of the first output voltage VOUT of the buck mode and the voltage level of the third output voltage VOUT of the boost mode.

More specifically, when the buck-boost converter 100 operates in the buck-boost mode, the converting circuit 120 may repetitively perform a current build-up operation, a first current transfer operation, and a second current transfer operation. For example, when the converting circuit 120 performs the current build-up operation, the converting circuit 120 may form a first current flow path PHI3. That is, for example, the current of the converting circuit 120 may flow through the third switch S3, the inductor L, and the sixth switch S6. On the other hand, when the converting circuit 120 performs the first current transfer operation, the converting circuit 120 may form a second current flow path PHI4. That is, for example, the current of the converting circuit 120 may flow through the third switch S3, the inductor L, and the fifth switch S5. In addition, when the converting circuit 120 performs the second current transfer operation, the converting circuit 120 may form a third current flow path PHI5. That is, for example, the current of the converting circuit 120 may flow through the fourth switch S4, the inductor L, and the fifth switch S5. Therefore, as illustrated in FIG. 6B, when an operating period BR+TR1+TR2 in which the converting circuit 120 operates is fixed, the voltage level of the second output voltage VOUT may be closer to the voltage level of the input voltage VIN as a length of a first period BR in which the converting circuit 120 performs the current build-up operation is closer to a length of a third period TR2 in which the converting circuit 120 performs the second current transfer operation. In addition, conversion efficiency of the buck-boost converter 100 may be improved during a second period TR1 in which the converting circuit 120 performs the first current transfer operation. For example, the conversion efficiency of the buck-boost converter 100 may get higher as the second period TR1 in which the converting circuit 120 performs the first current transfer operation gets wider. The first switch S1 may couple the first terminal of the inductor L to the third switch S3 (indicated as LH) when the third switch S3 is turned on. The first switch S1 may couple the first terminal of the inductor L to the fourth switch S4 (indicated as LL) when the fourth switch S4 is turned on. The second switch S2 may couple the second terminal of the inductor L to the fifth switch S5 (indicated as LH) when the fifth switch S5 is turned on. The second switch S2 may couple the second terminal of the inductor L to the sixth switch S6 (indicated as LL) when the sixth switch S6 is turned on. When the converting circuit 120 forms the first current flow path PHI3, the first switching signal SW1 corresponding to the first switching operation of the first switch S1 may have a first voltage level LH (e.g., a logic 'high' level), and the second switching signal SW2 corresponding to the second switching operation of the second switch S2 may have a second voltage level LL (e.g., a logic 'low' level). When the converting circuit 120 forms the second current flow path PHI4, the first switching signal SW1 corresponding to the first switching operation of the first switch S1 may have the first voltage level LH (e.g., a logic 'high' level), and the second switching signal SW2 corresponding to the second switching operation of the second switch S2 may also have the first voltage level LH (e.g., a logic 'high' level). When the converting circuit 120 forms the third current flow path PHI5, the first switching signal SW1 corresponding to the first switching operation of the first switch S1 may have the second voltage level LL (e.g., a logic 'low' level), and the second switching signal SW2 corresponding to the second switching operation of the second switch S2 may have the first voltage level LH (e.g., a logic 'high' level). Here, the reference character "IL" refers to the current of the inductor L.

Figure 7:
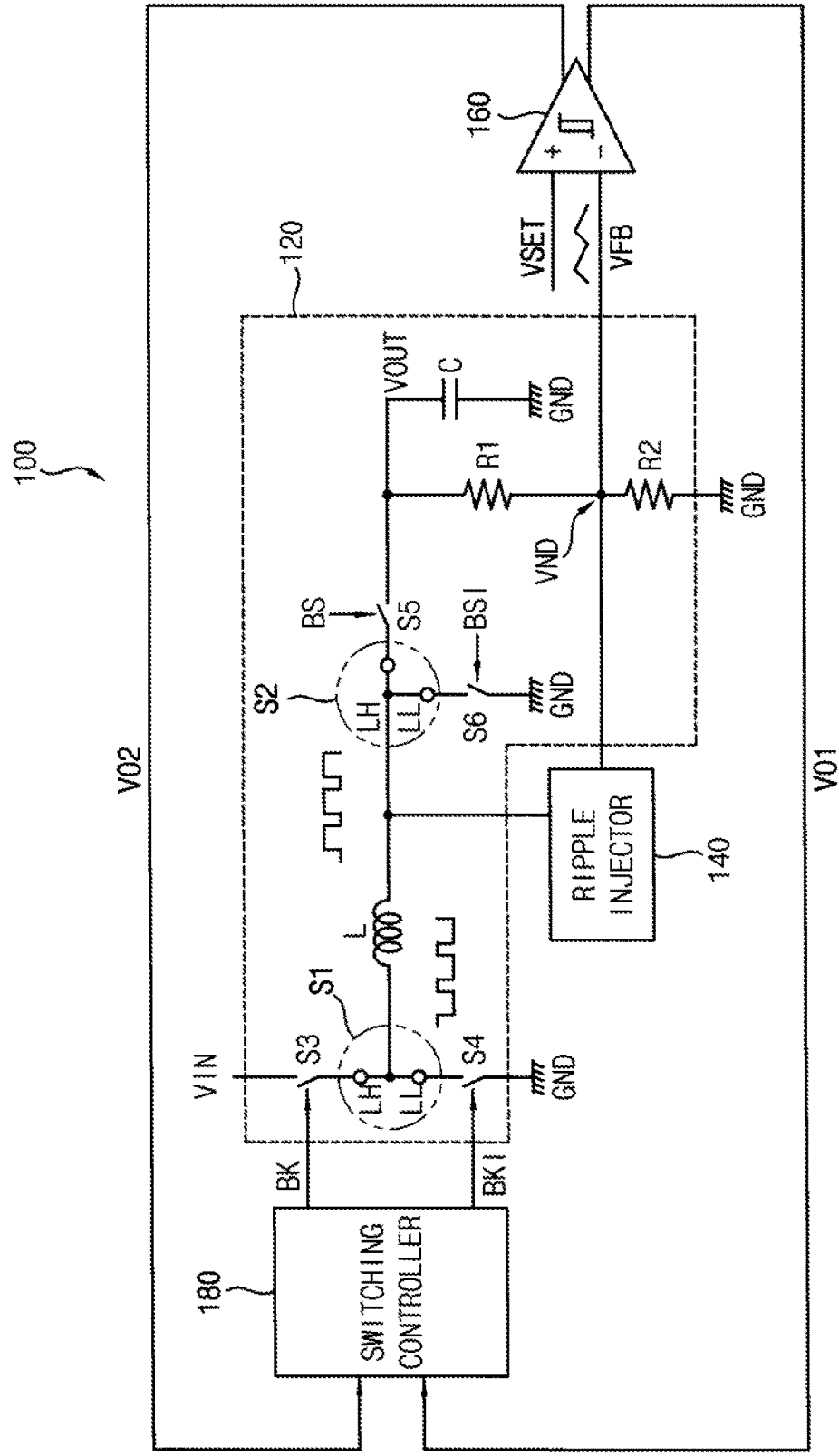
FIG. 7 is a block diagram illustrating an example in which the buck-boost converter of FIG. 1 operates in the buck-boost mode.
Figure 8:
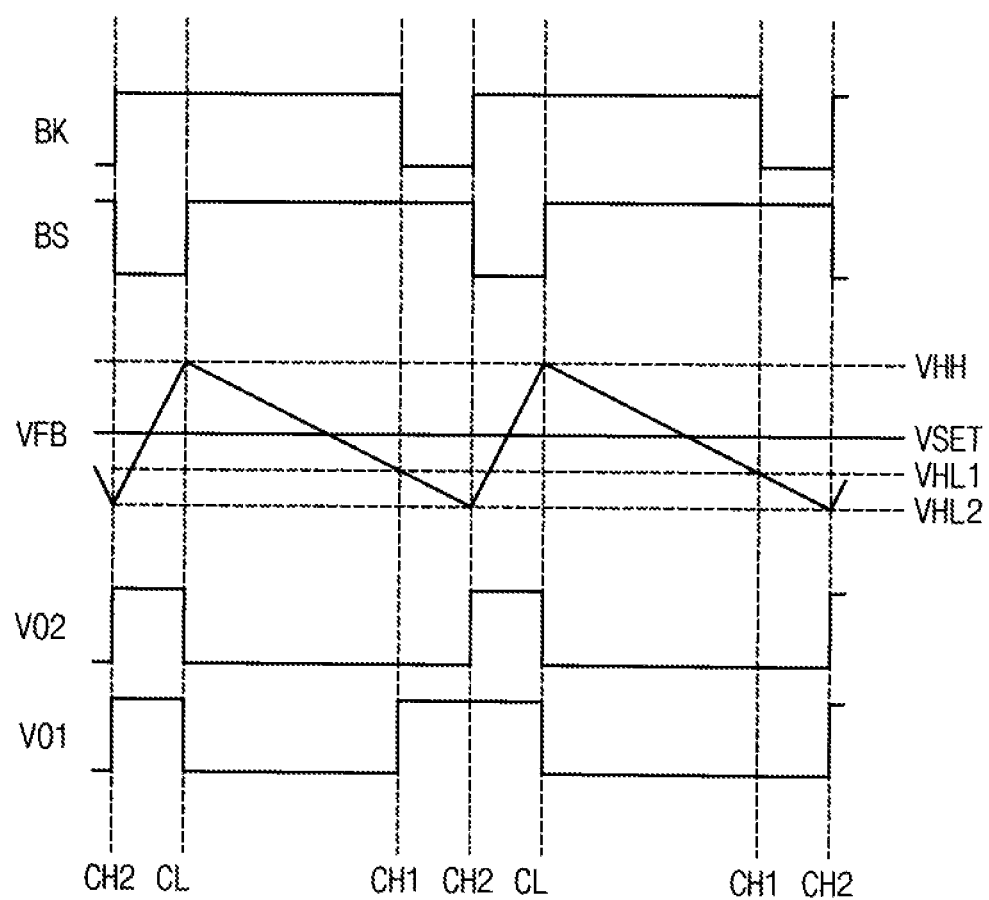
FIG. 8 is a timing diagram illustrating an example in which the buck-boost converter of FIG. 1 operates in the buck-boost mode.

FIG. 7 is a block diagram illustrating another example in which the buck-boost converter of FIG. 1 operates in the buck-boost mode. FIG. 8 is a timing diagram illustrating an example in which the buck-boost converter of FIG. 1 operates in the buck-boost mode.

Referring to FIGS. 7 and 8, the buck-boost converter 100 may generate the first switching control signal VO1 and the second switching control signal VO2 by comparing the output control voltage VSET with the feedback voltage VFB that is generated by adding the ripple to the divided voltage VND that is generated by performing a voltage division on the second output voltage VOUT. The buck-boost converter 100 may change the current flow path of the converting circuit 120 based on the first switching control signal VO1 and the second switching control signal VO2. Here, the third switch S3, the fourth switch S4, the fifth switch S5, and the sixth switch S6 may be controlled by combinations of the first switching control signal VO1 and the second switching control signal VO2.

As illustrated in FIG. 7, in the buck-boost mode, the current flow path of the converting circuit 120 may be changed as the third switch S3 and the fourth switch S4 are alternately turned on and the fifth switch S5 and the sixth switch S6 are alternately turned on. To this end, the third switching signal BK may be applied to the third switch S3, and the fourth switching signal BKI may be applied to the fourth switch S4. In at least one example embodiment, the third switch S3 and the fourth switch S4 may be implemented by the same type of transistors. In this case, the fourth switching signal BKI may be generated by inverting the third switching signal BK. In at least one other example embodiment, the third switch S3 and the fourth switch S4 may be implemented by different types of transistors. In this case, the fourth switching signal BKI may be the same as the third switching signal BK. In addition, the fifth switching signal BS may be applied to the fifth switch S5, and the sixth switching signal BSI may be applied to the sixth switch S6.

In at least one example embodiment, the fifth switch S5 and the sixth switch S6 may also be implemented by the same type of transistors. In this case, the sixth switching signal BSI may be generated by inverting the fifth switching signal BS. In at least one other example embodiment, the fifth switch S5 and the sixth switch S6 may be implemented by different types of transistors. In this case, the sixth switching signal BSI may be the same as the fifth switching signal BS.

In the converting circuit 120, the second switch S2 may couple the second terminal of the inductor L to the fifth switch S5 (indicated as LH) when the fifth switch S5 is turned on, and may couple the second terminal of the inductor L to the sixth switch S6 (indicated as LL) when the sixth switch S6 is turned on. Thus, the ripple injector 140 may generate the ripple based on the second switching signal SW2 corresponding to the above switching operation. In addition, the ripple from the ripple injector 140 may be added to the divided voltage VND, where the divided voltage VND is a DC voltage, at the resistor string including the first resistor R1 and the second resistor R2. Thus, the feedback voltage VFB corresponding to the ripple plus the divided voltage VND may be generated at the resistor string. Here, the feedback voltage VFB may be applied to a second input terminal (e.g., a negative input terminal) of the hysteresis comparator 160. In addition, the output control voltage VSET may be applied to a first input terminal (e.g., a positive input terminal) of the hysteresis comparator 160. As a result, the hysteresis comparator 160 may generate the first switching control signal VO1 and the second switching control signal VO2 by comparing the feedback voltage VFB with the output control voltage VSET.

As illustrated in FIG. 8, the hysteresis comparator 160 may have two hysteresis sections VHH–VHL2 and VHH–VHL1. More specifically, when the feedback voltage VFB is compared with the output control voltage VSET, the hysteresis comparator 160 may maintain a logic level of the first switching control signal VO1 and a logic level of the second switching control signal VO2 (e.g., the first logic level) until the feedback voltage VFB reaches an upper hysteresis voltage VHH even though the feedback voltage VFB becomes larger than the output control voltage VSET. Subsequently, when the feedback voltage VFB reaches the upper hysteresis voltage VHH, the hysteresis comparator 160 may change the logic level of the first switching control signal VO1 and the logic level of the second switching control signal VO2 from the first logic level to the second logic level (e.g., indicated as CL). Similarly, when the feedback voltage VFB is compared with the output control voltage VSET, the hysteresis comparator 160 may maintain the logic level of the first switching control signal VO1 (e.g., the second logic level) until the feedback voltage VFB reaches a first lower hysteresis voltage VHL1 and may maintain the logic level of the second switching control signal VO2 (e.g., the second logic level) until the feedback voltage VFB reaches a second lower hysteresis voltage VHL2 even though the feedback voltage VFB becomes smaller than the output control voltage VSET. Subsequently, when the feedback voltage VFB reaches the first lower hysteresis voltage VHL1, the hysteresis comparator 160 may change the logic level of the first switching control signal VO1 from the second logic level to the first logic level (e.g., indicated as CH1). Here, until the feedback voltage VFB reaches the second lower hysteresis voltage VHL2, the hysteresis comparator 160 may maintain the logic level of the second switching control signal VO2 (e.g., the second logic level). Subsequently, when the feedback voltage VFB reaches the second lower hysteresis voltage VHL2, the hysteresis comparator 160 may change the logic level of the second switching control signal VO2 from the second logic level to the first logic level (e.g., indicated as CH2). Thus, the switching controller 180 may change the current flow path of the converting circuit 120 based on combinations of the first switching control signal VO1 and the second switching control signal VO2. For example, the switching controller 180 may turn on the third switch S3, may turn off the fourth switch S4, may turn off the fifth switch S5, and may turn on the sixth switch S6 when the first switching control signal VO1 has the first logic level and the second switching control signal VO2 also has the first logic level. In addition, the switching controller 180 may turn on the third switch S3, may turn off the fourth switch S4, may turn on the fifth switch S5, and may turn off the sixth switch S6 when the first switching control signal VO1 has the second logic level and the second switching control signal VO2 also has the second logic level. Furthermore, the switching controller 180 may turn off the third switch S3, may turn on the fourth switch S4, may turn on the fifth switch S5, and may turn off the sixth switch S6 when the first switching control signal VO1 has the first logic level and the second switching control signal VO2 has the second logic level.

In the buck-boost mode, the converting circuit 120 may repetitively perform the current build-up operation, the first current transfer operation, and the second current transfer operation, and thus, may generate the third output voltage VOUT having a voltage level that is relatively close to the voltage level of the input voltage VIN. According to requirements of the buck-boost converter 100, a structure and operation of the hysteresis comparator 160 may be designed in various ways. For example, the hysteresis sections VHH–VHL2 and VHH–VHL1 of the hysteresis comparator 160 may be changed. Although it is described with reference to FIGS. 7 and 8 that the ripple injector 140 generates the ripple based on the second switching signal SW2, in at least some example embodiments the ripple injector 140 may generate the ripple based on the first switching signal SW1 or may generate the ripple based on combinations of the first switching signal SW1 and the second switching signal SW2.

Figure 9A:
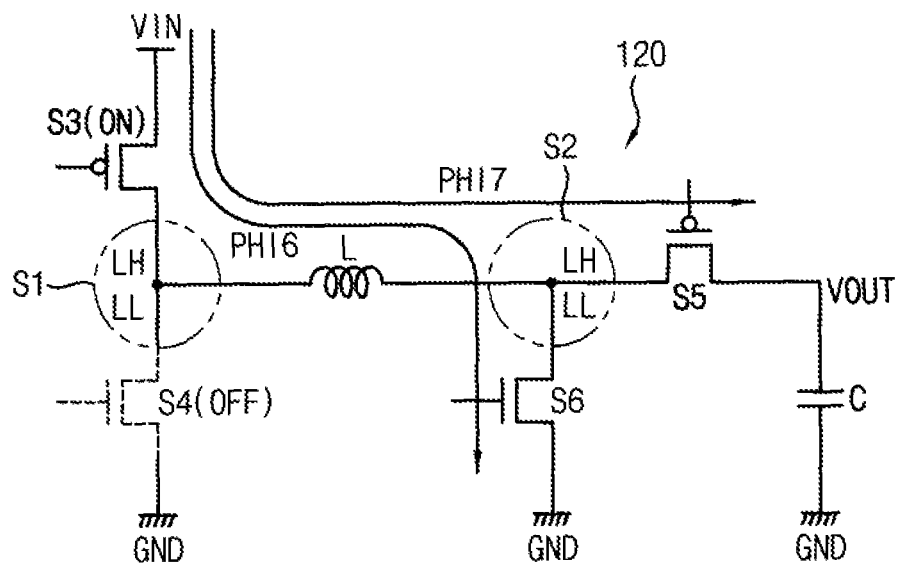
FIGS. 9A and 9B are diagrams for describing a boost mode of the buck-boost converter of FIG. 1.
Figure 9B:
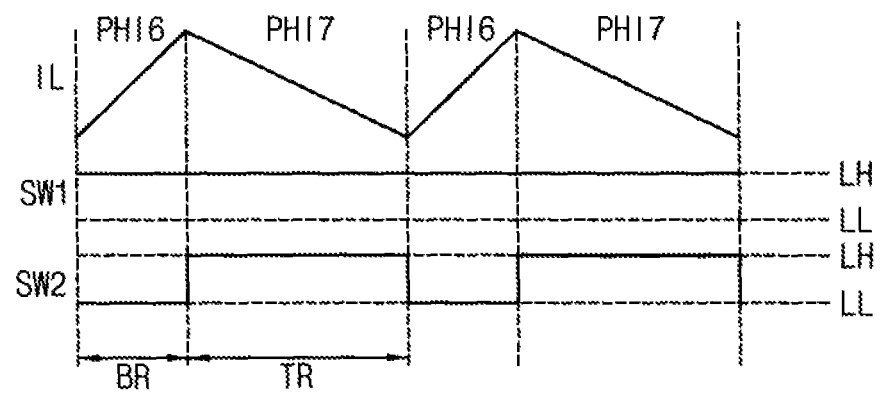

FIGS. 9A and 9B are diagrams for describing a boost mode of the buck-boost converter of FIG. 1.

Referring to FIGS. 9A and 9B, the buck-boost converter 100 may operate in the boost mode. As illustrated in FIG. 9A, in the boost mode, since the third switch S3 is maintained in an ON state and the fourth switch S4 is maintained in an OFF state, the current flow path of the converting circuit 120 may be changed as the fifth switch S5 and the sixth switch S6 are alternately turned on. As described above, since the buck-boost converter 100 generates the third output voltage VOUT by stepping up the input voltage VIN in the boost mode, the voltage level of the third output voltage VOUT may be higher than the voltage level of the input voltage VIN.

Specifically, when the buck-boost converter 100 operates in the boost mode, the converting circuit 120 may repetitively perform a current build-up operation and a current transfer operation. For example, when the converting circuit 120 performs the current build-up operation, the converting circuit 120 may form a first current flow path PHI6. That is, for example, the current of the converting circuit 120 may flow through the third switch S3, the inductor L, and the sixth switch S6. On the other hand, when the converting circuit 120 performs the current transfer operation, the converting circuit 120 may form a second current flow path PHI7. That is, for example, the current of the converting circuit 120 may flow through the third switch S3, the inductor L, and the fifth switch S5. Therefore, as illustrated in FIG. 9B, when an operating period BR+TR in which the converting circuit 120 operates is fixed, the third output voltage VOUT may increase during a first period BR in which the converting circuit 120 performs the current build-up operation. For example, the third output voltage VOUT may get higher as the first period BR in which the converting circuit 120 performs the current build-up operation gets wider. On the other hand, the third output voltage VOUT may decrease during a second period TR in which the converting circuit 120 performs the current transfer operation. For example, the third output voltage VOUT may get lower as the second period TR in which the converting circuit 120 performs the current transfer operation gets wider. The second switch S2 may couple the second terminal of the inductor L to the fifth switch S5 (indicated as LH) when the fifth switch S5 is turned on. The second switch S2 may couple the second terminal of the inductor L to the sixth switch S6 (indicated as LL) when the sixth switch S6 is turned on. When the converting circuit 120 forms the first current flow path PHI6, the second switching signal SW2 corresponding to the second switching operation of the second switch S2 may have a second voltage level LL (e.g., a logic 'low' level). When the converting circuit 120 forms the second current flow path PHI7, the second switching signal SW2 corresponding to the second switching operation of the second switch S2 may have a first voltage level LH (e.g., a logic 'high' level). Here, the reference character "IL" refers to the current of the inductor L. Meanwhile, in the boost mode, since the third switch S3 is maintained in an ON state and the fourth switch S4 is maintained in an OFF state, the first switching signal SW1 corresponding to the first switching operation of the first switch S1 may be maintained to have a first voltage level LH (e.g., a logic 'high' level).

Figure 10:
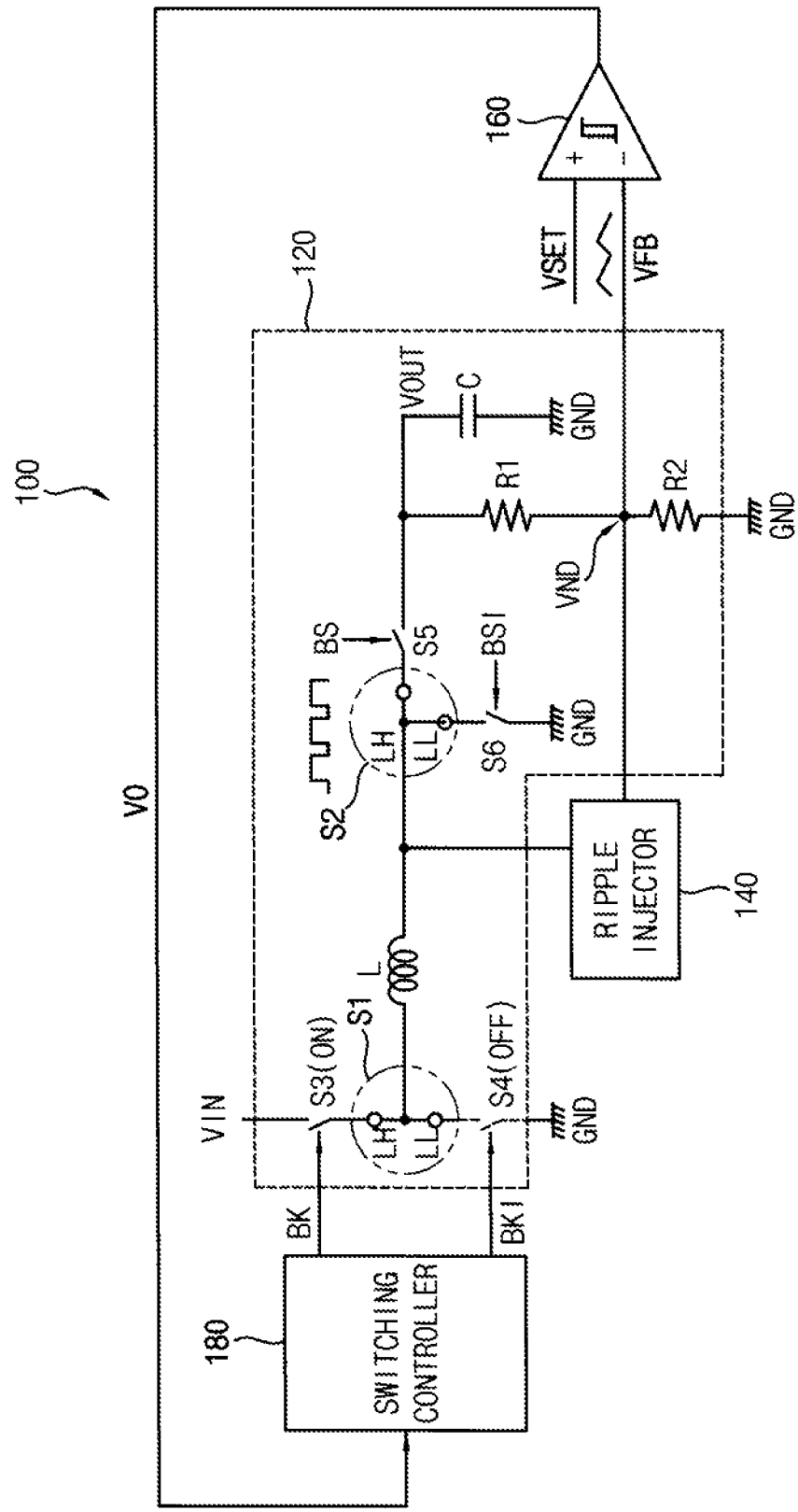
FIG. 10 is a block diagram illustrating an example in which the buck-boost converter of FIG. 1 operates in the boost mode.
Figure 11:
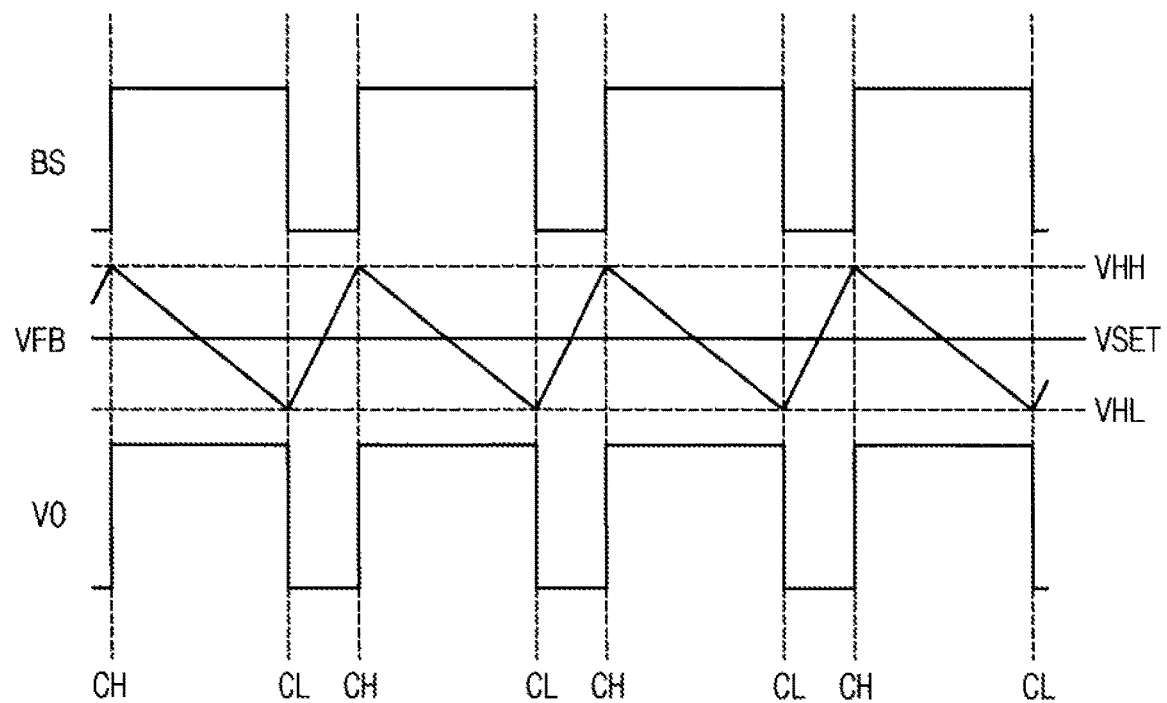
FIG. 11 is a timing diagram illustrating an example in which the buck-boost converter of FIG. 1 operates in the boost mode.

FIG. 10 is a block diagram illustrating another example in which the buck-boost converter of FIG. 1 operates in the boost mode. FIG. 11 is a timing diagram illustrating an example in which the buck-boost converter of FIG. 1 operates in the boost mode.

Referring to FIGS. 10 and 11, the buck-boost converter 100 may generate the switching control signal VO by comparing the output control voltage VSET with the feedback voltage VFB that is generated by adding the ripple to the divided voltage VND that is generated by performing a voltage division on the third output voltage VOUT. The buck-boost converter 100 may change the current flow path of the converting circuit 120 based on the switching control signal VO.

As illustrated in FIG. 10, in the boost mode, since the third switch S3 is maintained an ON state and the fourth switch S4 is maintained in an OFF state, the current flow path of the converting circuit 120 may be changed as the fifth switch S5 and the sixth switch S6 are alternately turned on. To this end, the fifth switching signal BS may be applied to the fifth switch S5, and the sixth switching signal BSI may be applied to the sixth switch S6. In at least one example embodiment, the fifth switch S5 and the sixth switch S6 may be implemented by the same type of transistors. In this case, the sixth switching signal BSI may be generated by inverting the fifth switching signal BS. In at least one other example embodiment, the fifth switch S5 and the sixth switch S6 may be implemented by different types of transistors. In this case, the sixth switching signal BSI may be the same as the fifth switching signal BS. In the converting circuit 120, the second switch S2 may couple the second terminal of the inductor L to the fifth switch S5 (indicated as LH) when the fifth switch S5 is turned on, and may couple the second terminal of the inductor L to the sixth switch S6 (indicated as LL) when the sixth switch S6 is turned on. Thus, the ripple injector 140 may generate the ripple based on the second switching signal SW2 corresponding to the above switching operation. In addition, the ripple may be added to the divided voltage VND, where the divided voltage VND is a DC voltage, at the resistor string including the first resistor R1 and the second resistor R2. Thus, the feedback voltage VFB corresponding to the ripple plus the divided voltage VND may be generated at the resistor string. Here, the feedback voltage VFB may be applied to a second input terminal (e.g., a negative input terminal) of the hysteresis comparator 160. In addition, the output control voltage VSET may be applied to a first input terminal (e.g., a positive input terminal) of the hysteresis comparator 160. As a result, the hysteresis comparator 160 may generate the switching control signal VO by comparing the feedback voltage VFB with the output control voltage VSET.

As illustrated in FIG. 11, the hysteresis comparator 160 may have one hysteresis section VHH–VHL. More specifically, when the feedback voltage VFB is compared with the output control voltage VSET, the hysteresis comparator 160 may maintain a logic level of the switching control signal VO (e.g., the second logic level) until the feedback voltage VFB reaches an upper hysteresis voltage VHH even though the feedback voltage VFB becomes larger than the output control voltage VSET. Subsequently, when the feedback voltage VFB reaches the upper hysteresis voltage VHH, the hysteresis comparator 160 may change the logic level of the switching control signal VO from the second logic level to the first logic level (indicated as CH). Similarly, when the feedback voltage VFB is compared with the output control voltage VSET, the hysteresis comparator 160 may maintain the logic level of the switching control signal VO (e.g., the first logic level) until the feedback voltage VFB reaches a lower hysteresis voltage VHL even though the feedback voltage VFB becomes smaller than the output control voltage VSET. Subsequently, when the feedback voltage VFB reaches the lower hysteresis voltage VHL, the hysteresis comparator 160 may change the logic level of the switching control signal VO from the first logic level to the second logic level (indicated as CL). Thus, the switching controller 180 may change the current flow path of the converting circuit 120 based on the switching control signal VO. For example, the switching controller 180 may turn on the fifth switch S5 and may turn off the sixth switch S6 when the switching control signal VO has the first logic level. In addition, the switching controller 180 may turn off the fifth switch S5 and may turn on the sixth switch S6 when the switching control signal VO has the second logic level. In the boost mode, the converting circuit 120 may repetitively perform the current build-up operation and the current transfer operation, and thus, may generate the third output voltage VOUT by stepping up the input voltage VIN.

Figure 12:
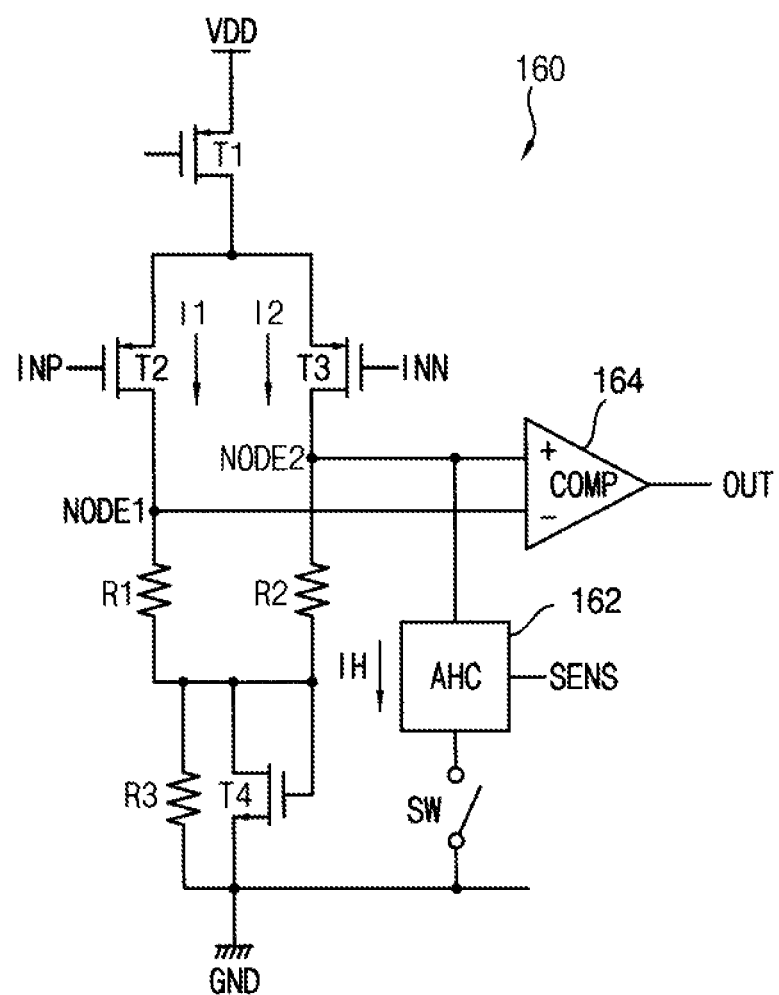
FIG. 12 is a block diagram illustrating an example embodiment of a hysteresis comparator included in the buck-boost converter of FIG. 1.

FIG. 12 is a block diagram illustrating an example embodiment of the hysteresis comparator included in the buck-boost converter of FIG. 1.

Referring to FIG. 12, the hysteresis comparator 160 may include a first current path (or current path circuit) T1, T2, R1, R3, and T4, a second current path (or current path circuit) T1, T3, R2, R3, and T4, a hysteresis control switch block (or circuit) SW, an adaptive hysteresis current block (or circuit) 162, and a comparison block (or circuit) 164.

The first current path T1, T2, R1, R3, and T4 may allow a first current I1 to flow based on a first input voltage INP. In at least one example embodiment, the first input voltage INP may be the feedback voltage VFB corresponding to the ripple from the ripple injector 140 plus the divided voltage VND.

The second current path T1, T3, R2, R3, and T4 may allow a second current I2 to flow based on a second input voltage INN. In at least one example embodiment, the second input voltage INN may be the output control voltage VSET corresponding to the divided voltage VND.

The comparison block 164 may output an output signal OUT having a first logic level or a second logic level, which is opposite to the first logic level, by comparing a first comparison voltage with a second comparison voltage. The first comparison voltage is generated at a first node NODE1 of the first current path T1, T2, R1, R3, and T4 as the first current I1 flows through the first current path T1, T2, R1, R3, and T4. The second comparison voltage is generated at a second node NODE2 of the second current path T1, T3, R2, R3, and T4 as the second current I2 flows through the second current path T1, T3, R2, R3, and T4. Here, the output signal OUT may be the switching control signal VO for changing the current flow path of the converting circuit 120.

The adaptive hysteresis current block 162 may be coupled to the first current path T1, T2, R1, R3, and T4 or the second current path T1, T3, R2, R3, and T4 to change (or adjust) a hysteresis section by sinking a portion of the first current I1 or a portion of the second current I2. Although it is illustrated in FIG. 12 that the adaptive hysteresis current block 162 is coupled to the second current path T1, T3, R2, R3, and T4, in at least some example embodiments, the adaptive hysteresis current block 162 may be coupled to the first current path T1, T2, R1, R3, and T4.

The hysteresis control switch block SW may control the sinking operation of the adaptive hysteresis current block 162 to form the hysteresis section. That is, for example, the hysteresis control switch block SW may control the adaptive hysteresis current block 162 to perform the sinking operation or not to perform the sinking operation. Although the hysteresis control switch block SW is shown as a switch in FIG. 12, the hysteresis control switch block SW is not limited to this example.

More specifically, as the first input voltage INP corresponding to the feedback voltage VFB increases, the second current I2 flowing through the second current path T1, T3, R2, R3, and T4 may increase, and thus, the second comparison voltage that is generated at the second node NODE2 of the second current path T1, T3, R2, R3, and T4 may increase. On the other hand, as the first input voltage INP corresponding to the feedback voltage VFB decreases, the second current I2 flowing through the second current path T1, T3, R2, R3, and T4 may decrease, and thus, the second comparison voltage that is generated at the second node NODE2 of the second current path T1, T3, R2, R3, and T4 may decrease. Thus, the hysteresis comparator 160 may sink a portion of the second current I2 by turning on the hysteresis control switch block SW when the first input voltage INP corresponding to the feedback voltage VFB increases. As a result, the second comparison voltage that is generated at the second node NODE2 of the second current path T1, T3, R2, R3, and T4 may decrease.

On the other hand, the hysteresis comparator 160 may not sink a portion of the second current I2 by turning off the hysteresis control switch block SW when the first input voltage INP corresponding to the feedback voltage VFB decreases. As a result, when the first input voltage INP corresponding to the feedback voltage VFB is compared with the second input voltage INN corresponding to the output control voltage VSET, a logic level of the output signal OUT (e.g., the switching control signal VO) output from the comparison block 164 may not be changed in the hysteresis section. As described above, the hysteresis section may be formed by the switching operation of the hysteresis control switch block SW. Here, the hysteresis comparator 160 may adaptively adjust the hysteresis section by changing (or adjusting) a sinking current LH.

Figure 13:
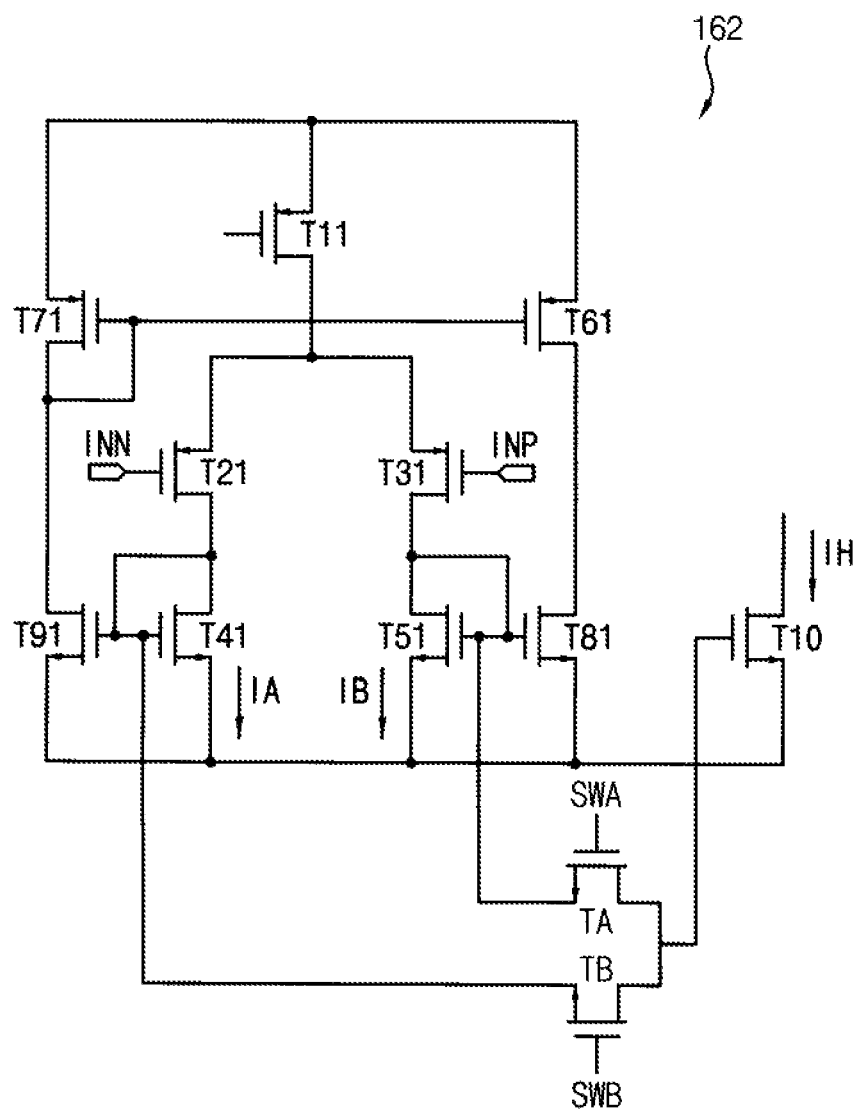
FIG. 13 is a circuit diagram illustrating an example embodiment of an adaptive hysteresis current circuit included in the hysteresis comparator of FIG. 12.
Figure 14:
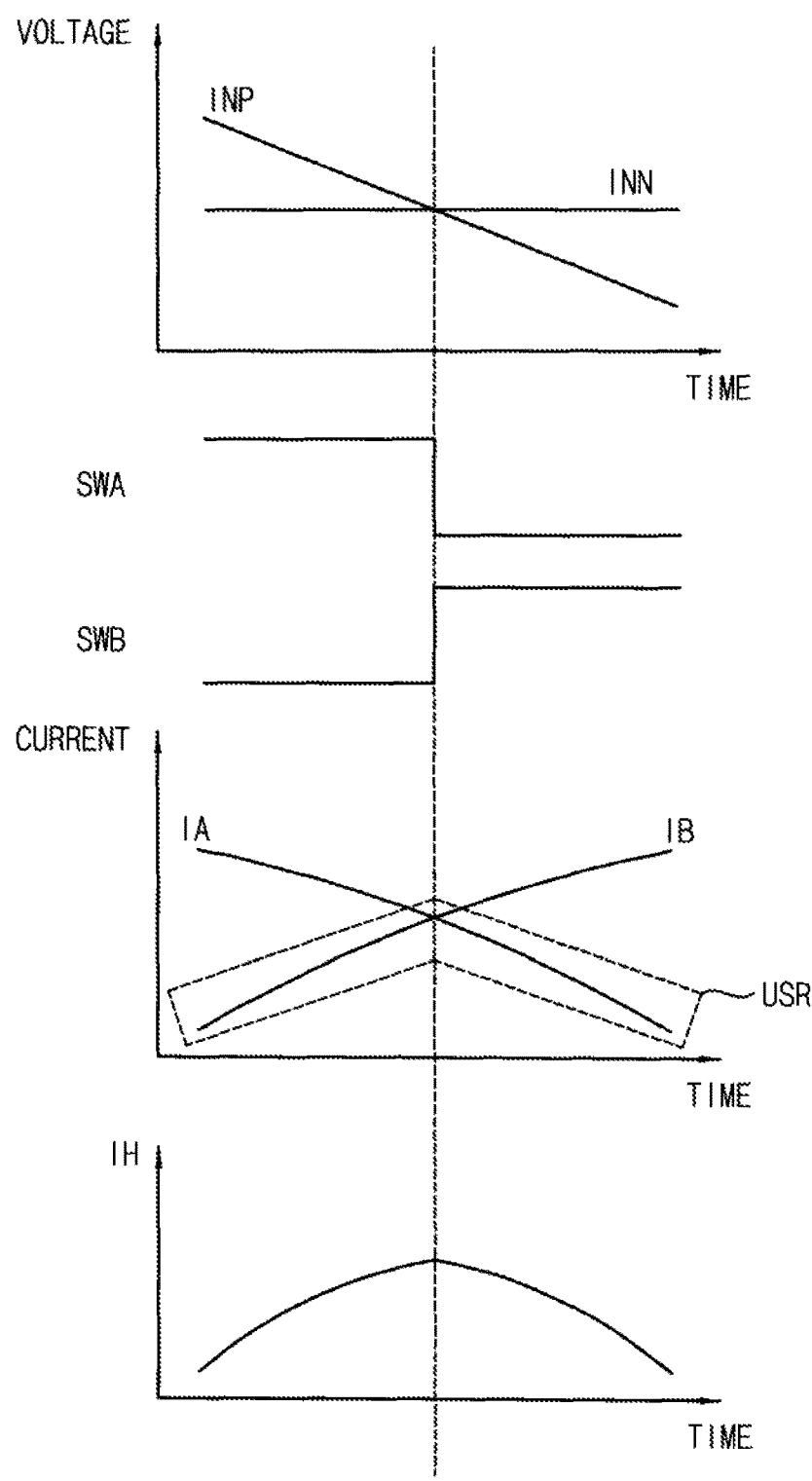
FIG. 14 is a diagram for describing example operation of the adaptive hysteresis current circuit of FIG. 13.

FIG. 13 is a circuit diagram illustrating an example embodiment of an adaptive hysteresis current block included in the hysteresis comparator of FIG. 12. FIG. 14 is a diagram for describing example operation of the adaptive hysteresis current block of FIG. 13.

Referring to FIGS. 13 and 14, the adaptive hysteresis current block 162 may include a third current path (or current path circuit) T11, T21, and T41, a fourth current path (or current path circuit) T11, T31, and T51, and a switch block (or circuit) TA, TB, and T10. Here, as illustrated in FIG. 13, a current mirror block (or circuit) T71, T91, T61, and T81 may be coupled to the third current path T11, T21, and T41, the fourth current path T11, T31, and T51, and the switch block TA, TB, and T10 to perform a current mirroring operation.

The third current path T11, T21, and T41 may allow a third current IA to flow based on a third input voltage INN. In at least one example embodiment, the third input voltage INN may be the output control voltage VSET corresponding to the divided voltage VND. The fourth current path T11, T31, and T51 may allow a fourth current IB to flow based on a fourth input voltage INP. In at least one example embodiment, the fourth input voltage INP may be the feedback voltage VFB corresponding to the ripple from the ripple injector 140 plus the divided voltage VND. Here, as illustrated in FIG. 14, when the fourth input voltage INP corresponding to the feedback voltage VFB is larger than the third input voltage INN corresponding to the divided voltage VND, the third current IA flowing through the third current path T11, T21, and T41 may be larger than the fourth current IB flowing through the fourth current path T11, T31, and T51. On the other hand, when the fourth input voltage INP corresponding to the feedback voltage VFB is smaller than the third input voltage INN corresponding to the divided voltage VND, the fourth current IB flowing through the fourth current path T11, T31, and T51 may be larger than the third current IA flowing through the third current path T11, T21, and T41. Here, the switch block TA, TB, and T10 may select (or determine) the fourth current IB flowing through the fourth current path T11, T31, and T51 as the sinking current IH when the fourth current IB flowing through the fourth current path T11, T31, and T51 is smaller than the third current IA flowing through the third current path T11, T21, and T41. In addition, the switch block TA, TB, and T10 may select the third current IA flowing through the third current path T11, T21, and T41 as the sinking current IH when the third current IA flowing through the third current path T11, T21, and T41 is smaller than the fourth current IB flowing through the fourth current path T11, T31, and T51. To this end, as illustrated in FIG. 14, a first current determination switch TA may be turned on by activating a first current determination signal SWA applied to the first current determination switch TA (e.g., by deactivating a second current determination signal SWB applied to the second current determination switch TB) when the third current IA flowing through the third current path T11, T21, and T41 is larger than the fourth current IB flowing through the fourth current path T11, T31, and T51. As a result, the fourth current IB flowing through the fourth current path T11, T31, and T51 may be determined as the sinking current IH. On the other hand, a second current determination switch TB may be turned on by activating the second current determination signal SWB applied to the second current determination switch TB (e.g., by deactivating the first current determination signal SWA applied to the first current determination switch TA) when the third current IA flowing through the third current path T11, T21, and T41 is smaller than the fourth current IB flowing through the fourth current path T11, T31, and T51. As a result, the third current IA flowing through the third current path T11, T21, and T41 may be determined as the sinking current IH. As described above, by using a smaller one (indicated as USR in FIG. 14) of the third current IA flowing through the third current path T11, T21, and T41 and the fourth current IB flowing through the fourth current path T11, T31, and T51 as the sinking current IH, the adaptive hysteresis current block 162 may reduce and/or minimize a frequency change due to a duty change when the adaptive hysteresis current block 162 changes (or adjusts) the hysteresis section of the hysteresis comparator 160.

Figure 15:
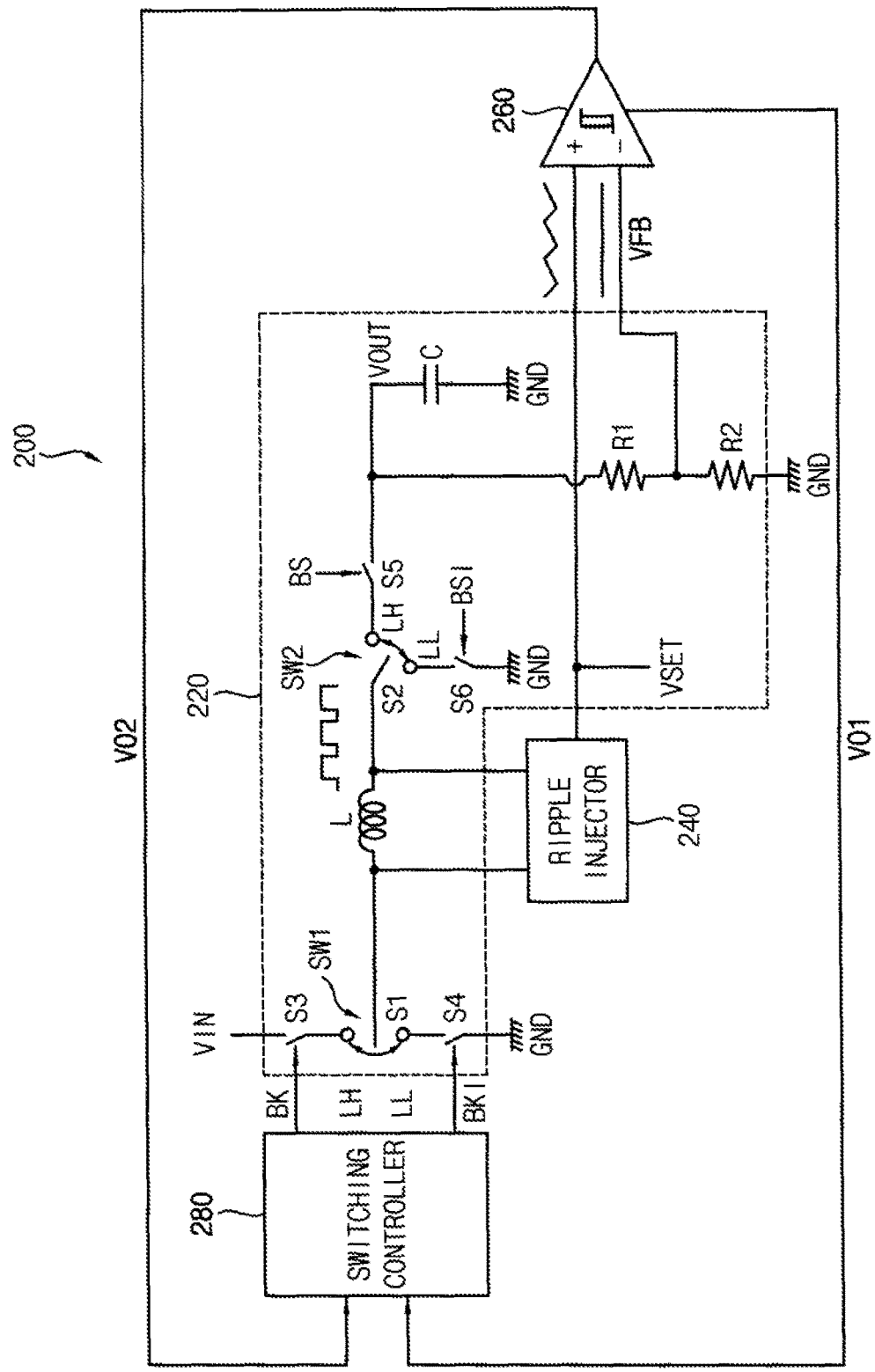
FIG. 15 is a block diagram illustrating a buck-boost converter according to example embodiments.

FIG. 15 is a block diagram illustrating another buck-boost converter according to example embodiments.

Referring to FIG. 15, the buck-boost converter 200 may include a converting circuit 220, a ripple injector (or ripple injector circuit) 240, a hysteresis comparator (or hysteresis comparison circuit) 260, and a switching controller (or switching control circuit) 280.

The converting circuit 220 may generate a first output voltage VOUT by stepping down an input voltage VIN in a buck mode, may generate a third output voltage VOUT by stepping up the input voltage VIN in a boost mode, and may generate a second output voltage VOUT by stepping up or down the input voltage VIN in a buck-boost mode, where the second output voltage has a voltage level between a voltage level of the first output voltage VOUT and a voltage level of the third output voltage VOUT.

Since the first output voltage VOUT is generated by stepping down the input voltage VIN, the voltage level of the first output voltage VOUT may be lower than a voltage level of the input voltage VIN.

Since the third output voltage VOUT is generated by stepping up the input voltage VIN, the voltage level of the third output voltage VOUT may be higher than the voltage level of the input voltage VIN.

Since the voltage level of the second output voltage VOUT is relatively close to the voltage level of the input voltage VIN, the voltage level of the second output voltage VOUT may be higher than the voltage level of the first output voltage VOUT and lower than the voltage level of the third output voltage VOUT. That is, for example, when the buck-boost converter 200 operates in the buck mode, the input voltage VIN may have a voltage level that is higher than the voltage level of the output voltage VOUT (i.e., the first output voltage VOUT). In addition, when the buck-boost converter 200 operates in the buck-boost mode, the input voltage VIN may have a voltage level that is relatively close to the voltage level of the output voltage VOUT (i.e., the second output voltage VOUT). Furthermore, when the buck-boost converter 200 operates in the boost mode, the input voltage VIN may have a voltage level that is lower than the voltage level of the output voltage VOUT (i.e., the third output voltage VOUT).

In at least one example embodiment, the converting circuit 220 may include an input part S3 and S4, an output part S5, S6, R1, R2, and C, an inductor L, a first switch S1, and a second switch S2. Specifically, the input part S3 and S4 may include a third switch S3 and a fourth switch S4. The third switch S3 may be coupled to the input voltage VIN. The fourth switch S4 may be coupled to a ground voltage GND. Thus, when the third switch S3 is turned on and the fourth switch S4 is turned off, the input part S3 and S4 may provide the input voltage VIN. In addition, when the third switch S3 is turned off and the fourth switch S4 is turned on, the input part S3 and S4 may provide the ground voltage GND. Here, the third switch S3 and the fourth switch S4 may operate in reverse. That is, for example, when the third switch S3 is turned on, the fourth switch S4 may be turned off. In addition, when the fourth switch S4 is turned on, the third switch S3 may be turned off.

In at least one example embodiment, the third switch S3 and the fourth switch S4 may be implemented by the same type of transistors. In this case, a third switching signal BK may be applied to the third switch S3, and a fourth switching signal BKI, which is generated by inverting the third switching signal BK, may be applied to the fourth switch S4. In at least one other example embodiment, the third switch S3 and the fourth switch S4 may be implemented by different types of transistors. In this case, a third switching signal BK may be applied to the third switch S3, and a fourth switching signal BKI, which is the same as the third switching signal BK, may be applied to the fourth switch S4. However, a structure of the input part S3 and S4 is not limited to these examples.

The output part S5, S6, R1, R2, and C may include a fifth switch S5, a sixth switch S6, a first resistor R1, a second resistor R2, and a capacitor C. Here, an output node through which the output voltage VOUT is output may be a coupling node at which a first terminal of the capacitor C is coupled to a first terminal of the first resistor R1. In addition, a division node through which a feedback voltage VFB is output may be a coupling node at which a second terminal of the first resistor R1 is coupled to a first terminal of the second resistor R2. That is, for example, the first resistor R1 and the second resistor R2 may constitute a resistor string for generating the feedback voltage VFB. The feedback voltage VFB may be generated such that a voltage division is performed on the output voltage VOUT by the first resistor R1 and the second resistor R2. That is, for example, a divided voltage that is stepped down from the output voltage VOUT by the resistor string may be output to the hysteresis comparator 260 as the feedback voltage VFB. In addition, a second terminal of the second resistor R2 may be coupled to the ground voltage GND, and a second terminal of the capacitor C may also be coupled to the ground voltage GND. The inductor L may be located between the input part S3 and S4 and the output part S5, S6, R1, R2, and C. Thus, when the fifth switch S5 is turned on and the sixth switch S6 is turned off, the inductor L may be coupled to the output node. In addition, when the sixth switch S6 is turned on and the fifth switch S5 is turned off, the inductor L may be coupled to the ground voltage GND. Here, the fifth switch S5 and the sixth switch S6 may operate in reverse. That is, for example, when the fifth switch S5 is turned on, the sixth switch S6 may be turned off In addition, when the sixth switch S6 is turned on, the fifth switch S5 may be turned off In at least one example embodiment, the fifth switch S5 and the sixth switch S6 may be implemented by the same type of transistors. In this case, a fifth switching signal BS may be applied to the fifth switch S5, and a sixth switching signal BSI, which is generated by inverting the fifth switching signal BS, may be applied to the sixth switch S6.

In at least one other example embodiment, the fifth switch S5 and the sixth switch S6 may be implemented by different types of transistors. In this case, a fifth switching signal BS may be applied to the fifth switch S5, and a sixth switching signal BSI, which is the same as the fifth switching signal BS, may be applied to the sixth switch S6. However, a structure of the output part S5, S6, R1, R2, and C is not limited to these examples.

The first switch S1 may perform a first switching operation that selectively couples a first terminal of the inductor L to the third switch S3 or the fourth switch S4 of the input part S3 and S4. Specifically, when the third switch S3 of the input part S3 and S4 is turned on, the first switch S1 may couple the first terminal of the inductor L to the third switch S3 of the input part S3 and S4 (indicated as LH). In addition, when the fourth switch S4 of the input part S3 and S4 is turned on, the first switch S1 may couple the first terminal of the inductor L to the fourth switch S4 of the input part S3 and S4 (indicated as LL). The second switch S2 may perform a second switching operation that selectively couples a second terminal of the inductor L to the fifth switch S5 or the sixth switch S6 of the output part S5, S6, R1, R2, and C. More specifically, when the fifth switch S5 of the output part S5, S6, R1, R2, and C is turned on, the second switch S2 may couple the second terminal of the inductor L to the fifth switch S5 of the output part S5, S6, R1, R2, and C (indicated as LH). In addition, when the sixth switch S6 of the output part S5, S6, R1, R2, and C is turned on, the second switch S2 may couple the second terminal of the inductor L to the sixth switch S6 of the output part S5, S6, R1, R2, and C (indicated as LL). As described above, the output part S5, S6, R1, R2, and C may output the first output voltage VOUT through the output node in the buck mode, may output the second output voltage VOUT through the output node in the buck-boost mode, and may output the third output voltage VOUT through the output node in the boost mode. For this operation, in the buck mode, the fifth switch S5 may be maintained in an ON state, the sixth switch S6 may be maintained in an OFF state, and the third switch S3 and the fourth switch S4 may be alternately turned on. In the buck-boost mode, the third switch S3 and the fourth switch S4 may be alternately turned on, and the fifth switch S5 and the sixth switch S6 may be alternately turned on. In the boost mode, the third switch S3 may be maintained in an ON state, the fourth switch S4 may be maintained in an OFF state, and the fifth switch S5 and the sixth switch S6 may be alternately turned on.

The ripple injector 240 may generate a ripple corresponding to an AC voltage based on switching signals SW1 and SW2 corresponding to switching operations of (or inside) the converting circuit 220 in the buck mode, in the buck-boost mode, and in the boost mode. More specifically, in the buck mode the ripple injector 240 may generate the ripple based on a first switching signal SW1 corresponding to a first switching operation of the first switch S1 included in the converting circuit 220. For example, the ripple that the ripple injector 240 generates in the buck mode may have a rising shape or a falling shape when the first switching signal SW1 has a first voltage level, and may have a falling shape or a rising shape when the first switching signal SW1 has a second voltage level, which is opposite to the first voltage level.

In the buck-boost mode, the ripple injector 240 may generate the ripple based on a second switching signal SW2 corresponding to a second switching operation of the second switch S2 included in the converting circuit 220. For example, the ripple that the ripple injector 240 generates in the buck-boost mode may have a falling shape or a rising shape when the second switching signal SW2 has a first voltage level, and may have a rising shape or a falling shape when the second switching signal SW2 has a second voltage level, which is opposite to the first voltage level.

In the boost mode, the ripple injector 240 may generate the ripple based on the second switching signal SW2 corresponding to the second switching operation of the second switch S2 included in the converting circuit 220. For example, the ripple that the ripple injector 240 generates in the boost mode may have a falling shape or a rising shape when the second switching signal SW2 has a first voltage level, and may have a rising shape or a falling shape when the second switching signal SW2 has a second voltage level, which is opposite to the first voltage level.

The hysteresis comparator 260 may output at least one switching control signal VO1 and VO2 by comparing a voltage that is generated by adding the ripple to an output control voltage VSET with the feedback voltage VFB (corresponding to a divided voltage) that is generated by performing a voltage division on the output voltage VOUT. That is, for example, the buck-boost converter 200 of FIG. 15 adds the ripple to the output control voltage VSET, whereas the buck-boost converter 100 of FIG. 1 adds the ripple to the divided voltage that is generated by performing a voltage division on the output voltage VOUT.

In the example embodiment shown in FIG. 15, in the buck mode the hysteresis comparator 260 may output the switching control signal VO1 and VO2 by comparing the voltage that is generated by adding the ripple to the output control voltage VSET with the feedback voltage VFB that is generated by performing a voltage division on the first output voltage VOUT. In the buck-boost mode, the hysteresis comparator 260 may output the switching control signal VO1 and VO2 by comparing the voltage that is generated by adding the ripple to the output control voltage VSET with the feedback voltage VFB that is generated by performing a voltage division on the second output voltage VOUT. In the boost mode, the hysteresis comparator 260 may output the switching control signal VO1 and VO2 by comparing the voltage that is generated by adding the ripple to the output control voltage VSET with the feedback voltage VFB that is generated by performing a voltage division on the third output voltage VOUT. Here, the feedback voltage VFB that is generated by performing a voltage division on the output voltage VOUT may be maintained to be equal or substantially equal to the output control voltage VSET. Therefore, the first output voltage VOUT may be determined according to the output control voltage VSET in the buck mode, the second output voltage VOUT may be determined according to the output control voltage VSET in the buck-boost mode, and the third output voltage VOUT may be determined according to the output control voltage VSET in the boost mode. In brief, the buck-boost converter 200 may adjust (or control) the output voltage VOUT by adjusting the output control voltage VSET.

The switching controller 280 may change a current flow path of the converting circuit 220 based on the switching control signal VO1 and VO2. As described above, the switching controller 280 may change the current flow path of the converting circuit 220 in the buck mode by maintaining the fifth switch S5 in an ON state, maintaining the sixth switch S6 in an OFF state, and alternately turning on the third switch S3 and the fourth switch S4. For example, a current of the converting circuit 220 may flow through the third switch S3, the inductor L, and the fifth switch S5 when the switching controller 280 turns on the third switch S3, and the current of the converting circuit 220 may flow through the fourth switch S4, the inductor L, and the fifth switch S5 when the switching controller 280 turns on the fourth switch S4.

The switching controller 280 may change the current flow path of the converting circuit 220 in the buck-boost mode by alternately turning on the third switch S3 and the fourth switch S4 and alternately turning on the fifth switch S5 and the sixth switch S6. For example, the current of the converting circuit 220 may flow through the third switch S3, the inductor L, and the sixth switch S6 when the switching controller 280 turns on the third switch S3 and the sixth switch S6, the current of the converting circuit 220 may flow through the third switch S3, the inductor L, and the fifth switch S5 when the switching controller 280 turns on the third switch S3 and the fifth switch S5, and the current of the converting circuit 220 may flow through the fourth switch S4, the inductor L, and the fifth switch S5 when the switching controller 280 turns on the fourth switch S4 and the fifth switch S5.

The switching controller 280 may change the current flow path of the converting circuit 220 in the boost mode by maintaining the third switch S3 in an ON state, maintaining the fourth switch S4 in an OFF state, and alternately turning on the fifth switch S5 and the sixth switch S6. For example, the current of the converting circuit 220 may flow through the third switch S3, the inductor L, and the fifth switch S5 when the switching controller 280 turns on the fifth switch S5, and the current of the converting circuit 220 may flow through the third switch S3, the inductor L, and the sixth switch S6 when the switching controller 280 turns on the sixth switch S6.

As described above, the buck-boost converter 200 may generate the ripple based on the switching signals SW1 and SW2 corresponding to the switching operations of the converting circuit 220, may output the switching control signal VO1 and VO2 by comparing the voltage that is generated by adding the ripple to the output control voltage VSET with the feedback voltage VFB that is generated by performing a voltage division on the output voltage VOUT, and may change the current flow path of the converting circuit 220 based on the switching control signal VO1 and VO2 in the buck mode, the buck-boost mode, and the boost mode when the buck-boost converter 200 converts the input voltage VIN into the output voltage VOUT. Thus, the buck-boost converter 200 may output the first output voltage VOUT, which is stepped down from the input voltage VIN, in the buck mode, may output the second output voltage VOUT having the voltage level that is relatively close to the voltage level of the input voltage VIN in the buck-boost mode, and may output the third output voltage VOUT, which is stepped up from the input voltage VIN, in the boost mode. That is, for example, using one input voltage VIN, the buck-boost converter 200 may output the output voltage VOUT having a wider output range as compared to conventional buck-boost converters. Here, the buck-boost converter 200 may achieve relatively high (or improved) conversion efficiency because the buck-boost converter 200 operates based on the hysteresis-based control. In addition, a power management integrated circuit including the buck-boost converter 200 may reduce power consumption of internal devices (e.g., a processor, a memory device, etc.) included in an electronic device (e.g., a mobile device, etc.) by more efficiently managing power supplied by a battery (or other power supply) of the electronic device. Meanwhile, although components of the buck-boost converter 200 for describing example operation of the buck-boost converter 200 are illustrated in FIG. 15, components of the buck-boost converter 200 are not limited to this example. For example, the buck-boost converter 200 may further include a resistor, a capacitor, an inductor, an inverter, a buffer, etc.

Figure 16:
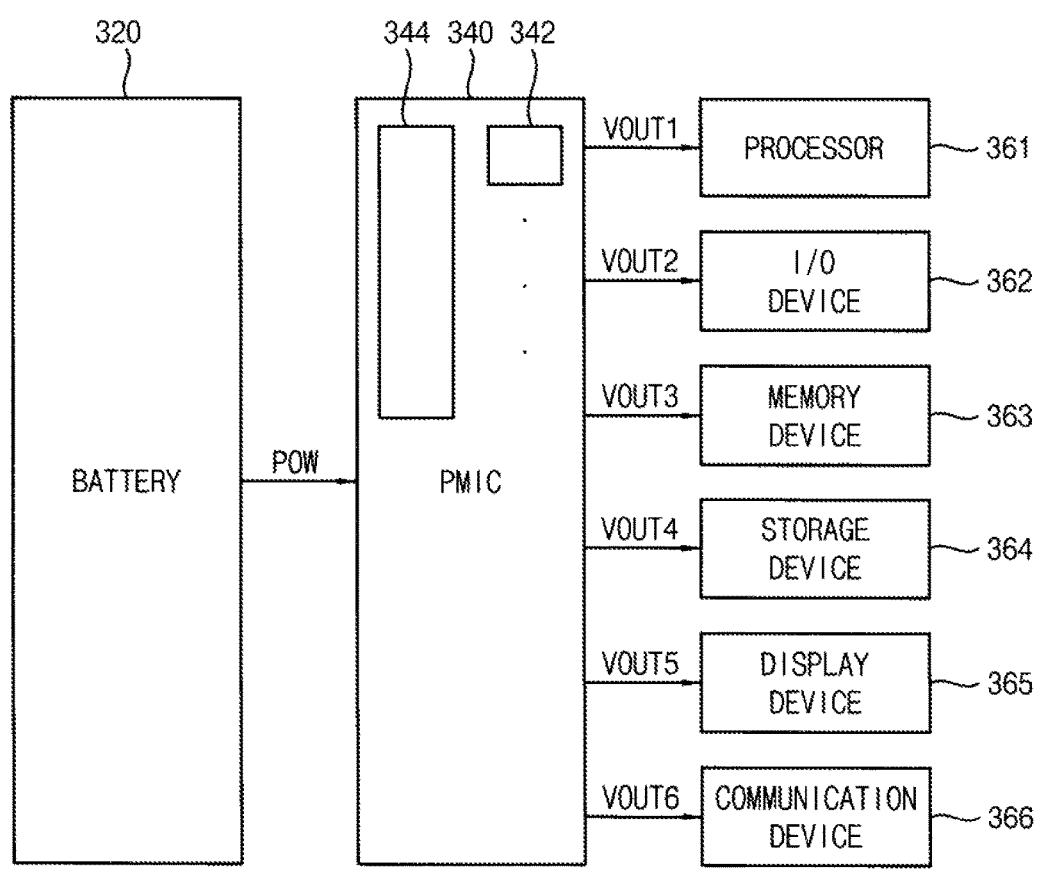
FIG. 16 is a block diagram illustrating a power management integrated circuit according to example embodiments.

FIG. 16 is a block diagram illustrating a power management integrated circuit according to example embodiments.

Referring to FIG. 16, the power management integrated circuit 340 may include at least one buck-boost converter 342 and a power management processor 344 that controls the buck-boost converter 342.

As illustrated in FIG. 16, the power management integrated circuit 340 may be coupled to a battery 320 (or other power supply) and internal devices 361 through 366 of an electronic device. The power management integrated circuit 340 may receive an input voltage POW from the battery 320 to provide output voltages VOUT1 through VOUT6 to the internal devices 361 through 366 included in the electronic device, respectively. In other words, since the output voltages 361 through 366 that respective internal devices 361 through 366 included in the electronic device require may be different, the power management integrated circuit 340 may generate the output voltages VOUT1 through VOUT6 based on the input voltage POW. To this end, the buck-boost converter 342 included in the power management integrated circuit 340 may include a converting circuit, a ripple injector, a hysteresis comparator, and a switching controller, according to one or more example embodiments discussed herein. As discussed herein, according to at least some example embodiments, the converting circuit may generate a first output voltage by stepping down the input voltage POW in a buck mode, may generate a third output voltage by stepping up the input voltage POW in a boost mode, and may generate a second output voltage having a voltage level between a voltage level of the first output voltage and a voltage level of the third output voltage by stepping up or down the input voltage POW in a buck-boost mode. The ripple injector may generate a ripple corresponding to an AC voltage based on switching signals corresponding to switching operations of the converting circuit in the buck mode, the buck-boost mode, and the boost mode. The hysteresis comparator may output at least one switching control signal by comparing an output control voltage with a feedback voltage that is generated by adding the ripple to a divided voltage that is generated by perform a voltage division on the output voltage (e.g., the first output voltage, the second output voltage, and the third output voltage) in the buck mode, the buck-boost mode, and the boost mode. The switching controller may change a current flow path of the converting circuit based on the switching control signal. Since the buck-boost converter 342 is described in detail above with regard to example embodiments, duplicated description will not be repeated. In brief, the power management integrated circuit 340 may more efficiently manage power supplied by the battery 320 by including the buck-boost converter.

As illustrated in FIG. 16, a processor 361, an I/O device 362, a memory device 363, a storage device 364, a display device 365, and a communication device 366 may receive the output voltage VOUT1, the output voltage VOUT2, the output voltage VOUT3, the output voltage VOUT4, the output voltage VOUT5, and the output voltage VOUT6, respectively, from the power management integrated circuit 340. As a result, the processor 361, the I/O device 362, the memory device 363, the storage device 364, the display device 365, and the communication device 366 may operate based on the output voltage VOUT1, the output voltage VOUT2, the output voltage VOUT3, the output voltage VOUT4, the output voltage VOUT5, and the output voltage VOUT6, respectively.

Figure 17:
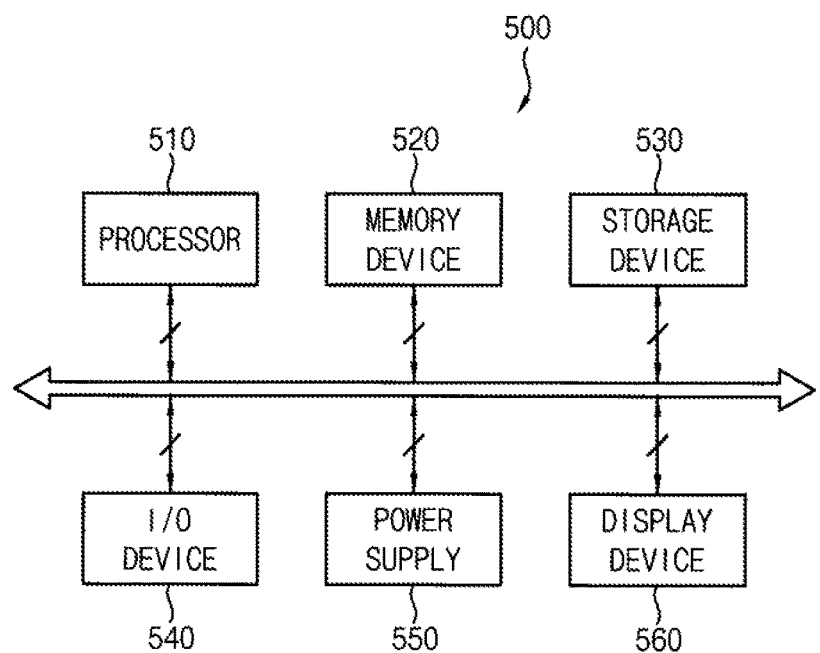
FIG. 17 is a block diagram illustrating an electronic device according to example embodiments.
Figure 18:
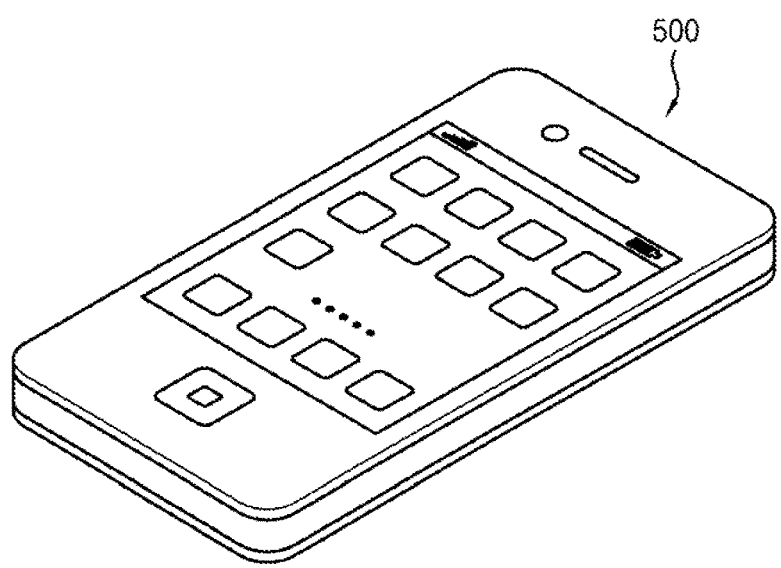
FIG. 18 is a diagram illustrating an example in which the electronic device of FIG. 17 is implemented as a smart phone.

FIG. 17 is a block diagram illustrating an electronic device according to example embodiments. FIG. 18 is a diagram illustrating an example in which the electronic device of FIG. 17 is implemented as a smart phone.

Referring to FIGS. 17 and 18, the electronic device 500 may include a processor 510, a memory device 520, a storage device 530, an input/output (I/O) device 540, a power supply 550, and a display device 560. In addition, the electronic device 500 may further include a plurality of ports for communicating with a video card, a sound card, a memory card, a universal serial bus (USB) device, other electronic devices, etc. As illustrated in FIG. 18, in at least one example embodiment, the electronic device 500 may be implemented as a smart phone. However, the electronic device 500 is not limited thereto. That is, for example, the electronic device 500 should be interpreted as an electronic device including a DC-DC converter (or, alternatively, a power management integrated circuit including the DC-DC converter). For example, the electronic device 500 may be implemented as a cellular phone, a smart pad, a tablet personal computer (PC), a personal digital assistant (PDA), a portable multimedia player (PMP), a wearable device including a watch or other accessory, etc.

Referring to FIG. 17, the processor 510 may perform various computing functions. The processor 510 may be a micro-processor, a central processing unit (CPU), an application processor (AP), etc. The processor 510 may be coupled to the memory device 520, the storage device 530, the I/O device 540, and the display device 560 via an address bus, a control bus, a data bus, etc. In at least some example embodiments, the processor 510 may be coupled to an extended bus such as a peripheral component interconnection (PCI) bus.

The memory device 520 may store data for operations of the electronic device 500. For example, the memory device 520 may include a volatile semiconductor memory device such as a dynamic random access memory (DRAM) device, a static random access memory (SRAM) device, a mobile DRAM, etc., and a non-volatile semiconductor memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc. The storage device 530 may include a solid state drive (SSD) device, a hard disk drive (HDD) device, a CD-ROM device, etc.

The I/O device 540 may include an input device such as a keyboard, a keypad, a touchpad, a touch-screen, a mouse device, etc., and an output device such as a printer, a speaker, etc. The display device 560 may display an image to provide visual information to users. In at least some example embodiments, the display device 560 may be included in the I/O device 540. The power supply 550 may provide power for operations of the electronic device 500. In at least one example embodiment, the power supply 550 may include a power management integrated circuit according to example embodiments. In another example embodiment, the power supply 550 may be coupled to a power management integrated circuit according to example embodiments. Here, the power management integrated circuit may convert a voltage supplied by a battery (or other the power supply 550) into voltages that are suitable for internal devices of the electronic device 500 (e.g., the processor 510, the memory device 520, the storage device 530, the I/O device 540, the display device 560, etc.). For this operation, the power management integrated circuit may include at least one buck-boost converter and a power management processor that controls the buck-boost converter. Here, the buck-boost converter may generate a ripple based on switching signals corresponding to switching operations of (or inside) a converting circuit, may output a switching control signal by comparing an output control voltage with a feedback voltage that is generated by adding the ripple to a divided voltage that is generated by performing a voltage division on an output voltage, and may change a current flow path of the converting circuit based on the switching control signal in a buck mode, a buck-boost mode, and a boost mode when the buck-boost converter converts an input voltage into an output voltage. Thus, using one input voltage, the buck-boost converter may output an output voltage that is stepped down from the input voltage, may output an output voltage having a voltage level that is relatively close to a voltage level of the input voltage, and may output an output voltage that is stepped up from the input voltage by changing the current flow path of the converting circuit based on the switching control signal.

As described above, buck-boost converters may achieve relatively high (or improved) conversion efficiency because the buck-boost converter operates based on a hysteresis-based control. To this end, buck-boost converters, according to one or more example embodiments, may include a converting circuit, a ripple injector, a hysteresis comparator, and a switching controller. The converting circuit may generate a first output voltage by stepping down the input voltage in the buck mode, may generate a third output voltage by stepping up the input voltage in the boost mode, and may generate a second output voltage having a voltage level between a voltage level of the first output voltage and a voltage level of the third output voltage by stepping up or down the input voltage in the buck-boost mode.

The ripple injector may generate a ripple corresponding to an AC voltage based on switching signals corresponding to switching operations of the converting circuit in the buck mode, the buck-boost mode, and the boost mode.

The hysteresis comparator may output at least one switching control signal by comparing the output control voltage with the feedback voltage that is generated by adding the ripple to the divided voltage that is generated by perform a voltage division on the output voltage (e.g., the first output voltage, the second output voltage, and the third output voltage) in the buck mode, the buck-boost mode, and the boost mode.

The switching controller may change the current flow path of the converting circuit based on the switching control signal. Since buck-boost converters, according to example embodiments, are described in detail above, duplicated description will not be repeated. In brief, the power management integrated circuit included in or coupled to the power supply 550 may more efficiently manage power supplied by the battery (or other the power supply 550) by including a buck-boost converter. Thus, power consumption of the internal devices (e.g., the processor 510, the memory device 520, the storage device 530, the I/O device 540, the display device 560, etc.) included in the electronic device 500 may be reduced.

One or more example embodiments of inventive concepts may be applied to DC-DC converters (or power management integrated circuits including DC-DC converters), and electronic devices including DC-DC converters. For example, example embodiments of inventive concepts may be applied to computers, laptops, digital cameras, cellular phones, smart phones, smart pads, tablet PCs, personal digital assistants (PDA), portable multimedia players (PMP), car navigation systems, video phones, wearable devices including watches or other accessories, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the inventive concepts. Accordingly, all such modifications are intended to be included within the scope of inventive concepts as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A buck-boost converter comprising:
   a converting circuit configured to
     generate a first output voltage by stepping down an input voltage in a buck mode,
     generate a second output voltage by stepping up or down the input voltage in a buck-boost mode, and
     generate a third output voltage by stepping up the input voltage in a boost mode, wherein the second output voltage has a voltage level between a voltage level of the first output voltage and a voltage level of the third output voltage;
   a ripple injector configured to generate a ripple corresponding to an alternating-current voltage based on switching signals corresponding to switching operations of the converting circuit in the buck mode, the buck-boost mode, and the boost mode;
   a hysteresis comparator configured to output at least one switching control signal based on a comparison between an output control voltage and a feedback voltage, the feedback voltage being generated by adding the ripple to a divided voltage, and the divided voltage being generated by performing voltage division on the first output voltage in the buck mode, performing voltage division on the second output voltage in the buck-boost mode, and performing voltage division on the third output voltage in the boost mode; and
   a switching controller configured to change a current flow path of the converting circuit based on the at least one switching control signal;
   wherein the hysteresis comparator includes
     a first current path circuit configured to allow a first current to flow based on the feedback voltage,
     a second current path circuit configured to allow a second current to flow based on the output control voltage,
     a comparison circuit configured to output the at least one switching control signal having a first logic level or a second logic level, which is opposite to the first logic level, based on a comparison between a first comparison voltage and a second comparison voltage, the first comparison voltage being generated at a first node of the first current path circuit as the first current flows through the first current path circuit, and the second comparison voltage being generated at a second node of the second current path circuit as the second current flows through the second current path circuit,
     an adaptive hysteresis current circuit coupled to the first current path circuit or the second current path circuit, the adaptive hysteresis current circuit being configured to adjust a hysteresis section by sinking a portion of the first current or a portion of the second current, and
     a hysteresis control switch circuit configured to control a sinking operation of the adaptive hysteresis current circuit to form the hysteresis section.

2. The converter of claim 1, wherein
   the divided voltage is maintained equal or substantially equal to the output control voltage;
   the first output voltage is determined according to the output control voltage in the buck mode;
   the second output voltage is determined according to the output control voltage in the buck-boost mode; and
   the third output voltage is determined according to the output control voltage in the boost mode.

3. The converter of claim 1, wherein the adaptive hysteresis current circuit includes:
   a third current path circuit configured to allow a third current to flow based on the output control voltage;
   a fourth current path circuit configured to allow a fourth current to flow based on the feedback voltage; and
   a switch circuit configured to
     select the third current as a sinking current when the third current is smaller than the fourth current, and
     select the fourth current as the sinking current when the fourth current is smaller than the third current.

4. The converter of claim 1, wherein the hysteresis comparator is configured to generate the at least one switching control signal by comparing the feedback voltage with the output control voltage based on a first hysteresis section in the buck mode and the boost mode.

5. The converter of claim 1, wherein the hysteresis comparator is configured to generate the at least one switching control signal by comparing the feedback voltage with the output control voltage based on a first hysteresis section and a second hysteresis section in the buck-boost mode.

6. A buck-boost converter comprising:
   a converting circuit configured to
     generate a first output voltage by stepping down an input voltage in a buck mode,
     generate a second output voltage by stepping up or down the input voltage in a buck-boost mode, and
     generate a third output voltage by stepping up the input voltage in a boost mode, wherein the second output voltage has a voltage level between a voltage level of the first output voltage and a voltage level of the third output voltage;
   a ripple injector configured to generate a ripple corresponding to an alternating-current voltage based on switching signals corresponding to switching operations of the converting circuit in the buck mode, the buck-boost mode, and the boost mode;
   a hysteresis comparator configured to output at least one switching control signal based on a comparison between an output control voltage and a feedback voltage, the feedback voltage being generated by adding the ripple to a divided voltage, and the divided voltage being generated by performing voltage division on the first output voltage in the buck mode, performing voltage division on the second output voltage in the buck-boost mode, and performing voltage division on the third output voltage in the boost mode; and a switching controller configured to change a current flow path of the converting circuit based on the at least one switching control signal;

wherein the converting circuit includes:
an input circuit including a third switch coupled to the input voltage and a fourth switch coupled to a ground voltage, the input circuit being configured to
provide the input voltage when the third switch is turned on and the fourth switch is turned off, and
provide the ground voltage when the fourth switch is turned on and the third switch is turned off,
an output circuit including a fifth switch coupled to an output node, a sixth switch coupled to the ground voltage, and a resistor string configured to generate the divided voltage, the output circuit being configured to
output the first output voltage through the output node in the buck mode,
output the second output voltage through the output node in the buck-boost mode, and
output the third output voltage through the output node in the boost mode,
an inductor between the input circuit and the output circuit,
a first switch configured to perform a first switching operation to selectively couple a first terminal of the inductor to one of the third switch and the fourth switch, and
a second switch configured to perform a second switching operation to selectively couple a second terminal of the inductor to one of the fifth switch and the sixth switch.

7. The converter of claim 6, wherein, in the buck mode, the fifth switch is maintained in an ON state, the sixth switch is maintained in an OFF state, and the third switch and the fourth switch are alternately turned on.

8. The converter of claim 6, wherein, in the buck-boost mode, the third switch and the fourth switch are alternately turned on, and the fifth switch and the sixth switch are alternately turned on.

9. The converter of claim 6, wherein, in the boost mode, the third switch is maintained in an ON state, the fourth switch is maintained in an OFF state, and the fifth switch and the sixth switch are alternately turned on.

10. The converter of claim 6, wherein the ripple injector is configured to generate the ripple based on a first switching signal corresponding to the first switching operation of the first switch in the buck mode.

11. The converter of claim 6, wherein the ripple injector is configured to generate the ripple based on a second switching signal corresponding to the second switching operation of the second switch in the buck-boost mode and the boost mode.

12. A power management integrated circuit comprising:
at least one buck-boost converter; and
a power management processor configured to control the at least one buck-boost converter;
wherein the at least one buck-boost converter includes
a converting circuit configured to
generate a first output voltage by stepping down an input voltage in a buck mode,
generate a second output voltage by stepping up or down the input voltage in a buck-boost mode, and
generate a third output voltage by stepping up the input voltage in a boost mode, wherein the second output voltage has a voltage level between a voltage level of the first output voltage and a voltage level of the third output voltage;
a ripple injector configured to generate a ripple corresponding to an alternating-current voltage based on switching signals corresponding to switching operations of the converting circuit in the buck mode, the buck-boost mode, and the boost mode;
a hysteresis comparator configured to output at least one switching control signal based on a comparison between an output control voltage and a feedback voltage, the feedback voltage being generated by adding the ripple to a divided voltage, and the divided voltage being generated by performing voltage division on the first output voltage in the buck mode, performing voltage division on the second output voltage in the buck-boost mode, and performing voltage division on the third output voltage in the boost mode; and
a switching controller configured to change a current flow path of the converting circuit based on the at least one switching control signal; and
wherein the hysteresis comparator includes
a first current path circuit configured to allow a first current to flow based on the feedback voltage,
a second current path circuit configured to allow a second current to flow based on the output control voltage,
a comparison circuit configured to output the at least one switching control signal having a first logic level or a second logic level, which is opposite to the first logic level, based on a comparison between a first comparison voltage and a second comparison voltage, the first comparison voltage being generated at a first node of the first current path circuit as the first current flows through the first current path circuit, and the second comparison voltage being generated at a second node of the second current path circuit as the second current flows through the second current path circuit;
an adaptive hysteresis current circuit coupled to the first current path circuit or the second current path circuit, the adaptive hysteresis current circuit being configured to adjust a hysteresis section by sinking a portion of the first current or a portion of the second current; and
a hysteresis control switch circuit configured to control a sinking operation of the adaptive hysteresis current circuit to form the hysteresis section.

13. The power management integrated circuit of claim 12, wherein the divided voltage is maintained equal or substantially equal to the output control voltage;
the first output voltage is determined according to the output control voltage in the buck mode;
the second output voltage is determined according to the output control voltage in the buck-boost mode; and
the third output voltage is determined according to the output control voltage in the boost mode.

14. The power management integrated circuit of claim 13, wherein the power management integrated circuit is implemented as a system-on-chip.

15. A power management integrated circuit comprising:
at least one buck-boost converter; and
a power management processor configured to control the at least one buck-boost converter;
wherein the at least one buck-boost converter includes
a converting circuit configured to generate a first output voltage by stepping down an input voltage in a buck mode, generate a second output voltage by stepping up or down the input voltage in a buck-boost mode, and generate a third output voltage by stepping up the input voltage in a boost mode, wherein the second output voltage has a voltage level between a voltage level of the first output voltage and a voltage level of the third output voltage, a ripple injector configured to generate a ripple corresponding to an alternating-current voltage based on switching signals corresponding to switching operations of the converting circuit in the buck mode, the buck-boost mode, and the boost mode, a hysteresis comparator configured to output at least one switching control signal based on a comparison between an output control voltage and a feedback voltage, the feedback voltage being generated by adding the ripple to a divided voltage, and the divided voltage being generated by performing voltage division on the first output voltage in the buck mode, performing voltage division on the second output voltage in the buck-boost mode, and performing voltage division on the third output voltage in the boost mode, and a switching controller configured to change a current flow path of the converting circuit based on the at least one switching control signal; and wherein the converting circuit includes an input circuit including a third switch coupled to the input voltage and a fourth switch coupled to a ground voltage, the input circuit being configured to provide the input voltage when the third switch is turned on and the fourth switch is turned off, and provide the ground voltage when the fourth switch is turned on and the third switch is turned off, an output circuit including a fifth switch coupled to an output node, a sixth switch coupled to the ground voltage, and a resistor string configured to generate the divided voltage, the output circuit being configured to output the first output voltage through the output node in the buck mode, output the second output voltage through the output node in the buck-boost mode, and output the third output voltage through the output node in the boost mode, an inductor between the input circuit and the output circuit, a first switch configured to perform a first switching operation to selectively couple a first terminal of the inductor to one of the third switch and the fourth switch, and a second switch configured to perform a second switching operation to selectively couple a second terminal of the inductor to one of the fifth switch and the sixth switch.

* * * * *